(12) United States Patent
Shimizu et al.

(10) Patent No.: US 6,289,254 B1
(45) Date of Patent: *Sep. 11, 2001

(54) PARTS SELECTION APPARATUS AND PARTS SELECTION SYSTEM WITH CAD FUNCTION

(75) Inventors: Munenori Shimizu; Takanobu Ichiki; Motoaki Kato, all of Yokohama; Kimiyoshi Hayashi, Soka; Hideki Sawada, Inagi; Katsuya Sato, Chigasaki; Yumi Muramatsu, Mishima; Hiroshi Kochiya; Takahiro Nakagawa, both of Yokohama; Tadatsugu Iyoda, Niiza, all of (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/010,308

(22) Filed: Jan. 21, 1998

(30) Foreign Application Priority Data

Jan. 24, 1997 (JP) ..................................................... 9-011550

(51) Int. Cl.$^7$ ....................................................... G06F 19/00
(52) U.S. Cl. ................................ 700/96; 700/97; 700/182
(58) Field of Search ............................... 700/96, 182, 97, 700/98, 99, 104, 106

(56) References Cited

U.S. PATENT DOCUMENTS

| | | | |
|---|---|---|---|
| 5,272,641 | * 12/1993 | Ford et al. | 700/97 |
| 5,311,437 | * 5/1994 | Leal et al. | 700/106 |
| 5,339,247 | * 8/1994 | Kirihara et al. | 700/106 |
| 5,504,687 | * 4/1996 | Wolf | 700/95 |
| 5,519,630 | 5/1996 | Nishiyama et al. | 395/500.01 |
| 5,646,862 | 7/1997 | Jolliffe et al. | 395/500.18 |
| 5,838,965 | * 11/1998 | Kavanagh et al. | 707/103 |
| 5,856,925 | * 1/1999 | Maeda et al. | 395/500.06 |

OTHER PUBLICATIONS

Waters et al., "Use an interchange format to port component libraries", E.D.N. Electrical Design News, Feb. 5, 1987, No. 3, pp. 175–185.

Arai et al., "A Design Model Integration Mechanism in the Design Environment Date", Systems and Computers in Japan; Nov. 1, 1993, No. 12, pp. 54–63.

Hiroyuki, "Data Conversion Processing Method in Drawing Control System", Patent Abstracts of Japan, vol. 96, No. 007, Jul. 31, 1996.

* cited by examiner

*Primary Examiner*—Paul P. Gordon
*Assistant Examiner*—Zoila Cabrera
(74) *Attorney, Agent, or Firm*—Morgan & Finnegan, LLP

(57) ABSTRACT

Since a plurality of electric CAD systems (CAD) 1 generate circuit diagram data with different data structures, input interface (IF) software (SOFT) implements processing for extracting predetermined item data used in parts selection SOFT from each CAD, and processing for adding data obtained by the parts selection SOFT to each CAD. The parts selection SOFT implements selection of parts, output of slips, and the like on the basis of the predetermined item data. Output IF-SOFT converts information associated with the selected parts output from the parts selection SOFT into a different data format used in the subsequent process, and outputs the converted information.

29 Claims, 40 Drawing Sheets

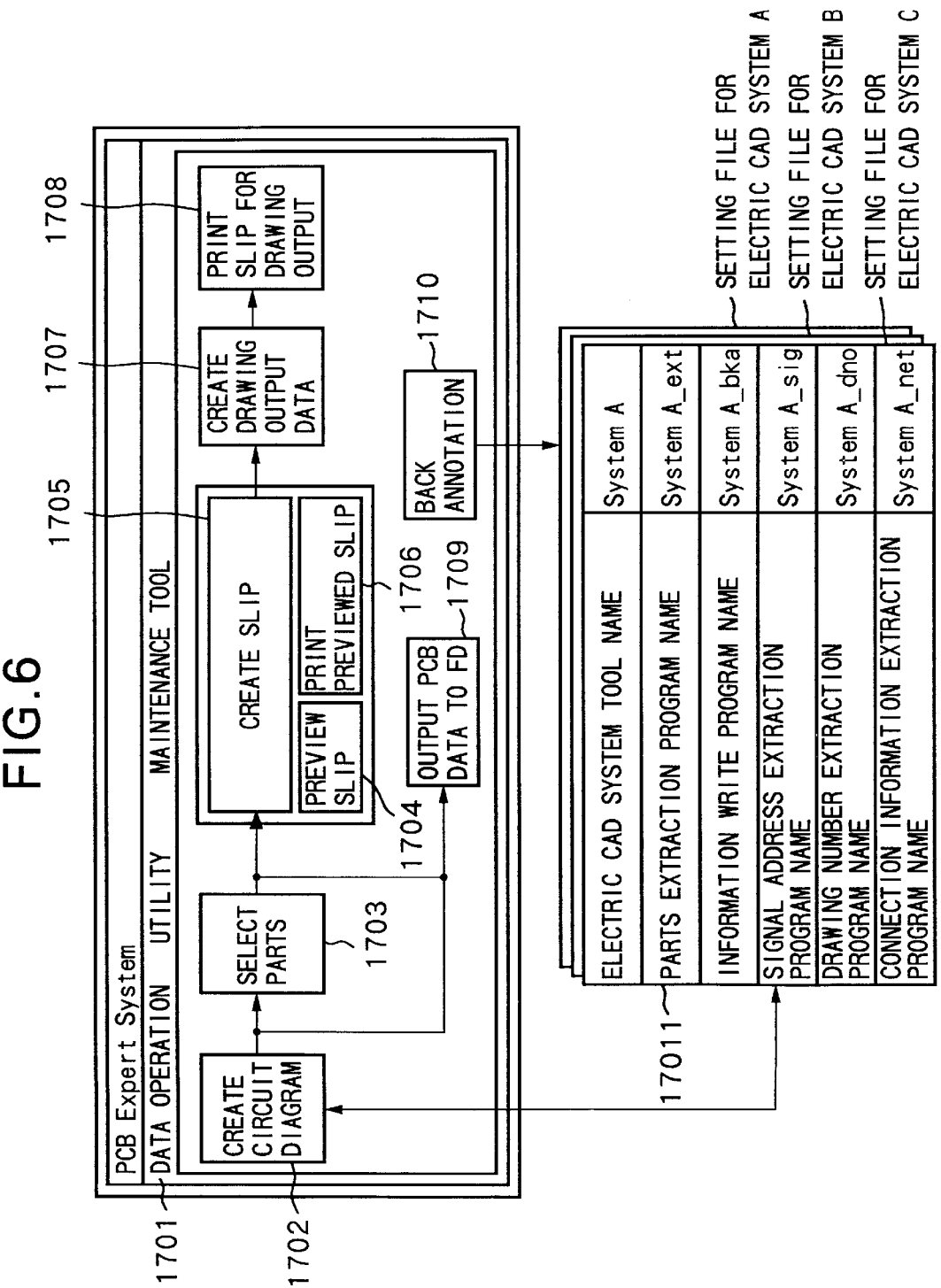

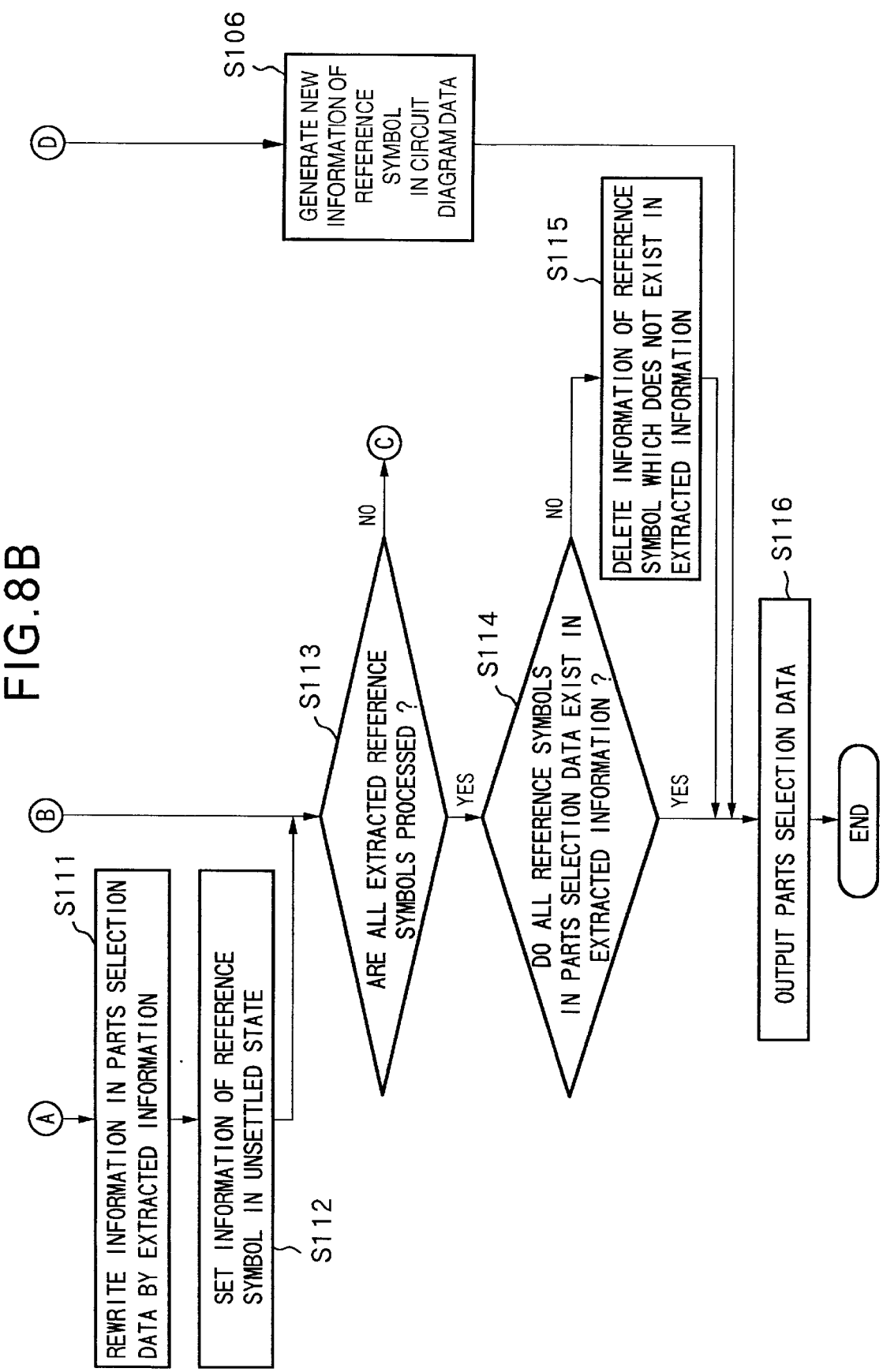

FIG.9

| DESCRIPTION IN ELECTRIC CAD | DESCRIPTION IN PARTS SELECTION DATA |
|---|---|
| EX | E |
| PE | P |
| T | T |
| G | G |
| MA | M |
| K | K |
| H | H |
| DA | DA |
| D | d |
| C | c |
| M | m |
| U | u |
| N | n |
| P | p |
| F | f |
| A | a |

PARTS SELECTION : PARTS SELECTION

D/B SEARCH CONDITION

| ITEM | CONDITION | MODE |
|---|---|---|
| SUPPLY NUMBER: | | PARTIAL MATCHING |
| ABBREVIATION: | | PARTIAL MATCHING |
| RATED VALUE: | | PARTIAL MATCHING |
| MAKER: | | PARTIAL MATCHING |
| MODEL NAME: | | PARTIAL MATCHING |

D/B HOST
- DB1
- DB2
- DB3

[SEARCH] [CLOSE]

ENTER SEARCH CONDITION

FIG.21

```
┌─────────────────────────────────────────────────┐
│           TITLE COLUMN INPUT          1201      │
│ FILE(F)  EDIT(E)                       HELP(H)  │
│ DRAWING NUMBER: [              ]                │
│    ABBREVIATION: [                         ]    │
│        DATE: [   ].[   ].[   ]  SET TODAY'S DATE│
│                                                 │
│          DESIGN                  DRAFTING       │
│  SECTION: [          ]    SECTION: [          ] │
│  NAME:    [          ]    NAME:    [          ] │
│                                                 │
│  CREATED SLIP:            NextAss'y:            │
│  ┌──────────────────────┐ ┌──────────────────┐  │
│  │ZUMEN-CIRCUIT SYMBOL T│ │ZUMEN-2222        │  │
│  │ZUMEN-COMPONENT PARTS │ │                  │  │
│  │ZUMEN-SIGNAL ADDRESS T│ │                  │  │ 1202
│  └──────────────────────┘ └──────────────────┘  │
│                                                 │
│  REVISION: [       ]                            │
│  REVISION   DATE      REMARKS         CHARGE    │
│  ┌──────┐ ┌──────┐ ┌──────────────┐ ┌────────┐  │
│  │      │ │      │ │              │ │        │  │
│  │      │ │      │ │              │ │        │  │
│  └──────┘ └──────┘ └──────────────┘ └────────┘  │
│   Message: [PARTS INFORMATION DATA TITLE COLUMN]│
└─────────────────────────────────────────────────┘
                              1203
```

FIG. 23

| PRODUCT | ASSEMBLY DRAWING | | COMPONETTS LIST | | DESCRIPTION OF DESIGN |
|---|---|---|---|---|---|
| SPECIFICATIONS | ASSEMBLY SPECIFICATION | | | | |
| | ZUMEN-1111-(1) | | PARTS TABLE (1) | | |
| | ZUMEN-1111-(2) | | PARTS TABLE (2) | | |
| | ZUMEN-1111-(3) | | PARTS TABLE (3) | | |
| | SYMBOL TABLE (1) | | PARTS TABLE (4) | | |
| | SYMBOL TABLE (2) | | | | |

| NOTE | REF. N. DATE | REVISION | BY |
|---|---|---|---|
| | | | |

| DATE 96.10.21 | APPRV. BY | DRAWN BY | TITLE TEST | | |
|---|---|---|---|---|---|
| | | | SHEET NO. | ZUMEN-1111 | |

FIG. 24

| REFERENCE SYMBOL | SUPPLY NUMBER | ABBREVIATION | RATED VALUE | MAKER | MODEL | REMARKS |
|---|---|---|---|---|---|---|
| C1 | AA8888 | CERA CAPACITOR | 220p, 250V, CC, R | AA | ABC-1234 | |
| C1 | BB7777 | CERA CAPACITOR | 220p, 250V, CC, R | AA | ABC-5678 | |
| Q1 | CC6666 | CMOS LOGIC | SCSI CONTROLLER | BB | DEF-1234 | |
| Q2 | DD5555 | TTI LOGIC | HEX-INVERTER | CC | DEF-567 | |
| | EE4444 | TTI LOGIC | HEX-INVERTER | DD | DEF-890 | |
| Q4 | FF3333 | TTL LOGIC | DECODER | EE | HI999 | |
| Q5 | GG2222 | TTL LOGIC | DECODER | EE | HI999 | |

| REF. N. DATE | REVISION | BY | NEXT ASS'Y | APPRV. BY | CHKD. BY | DESIGN BY | DRAWN BY | TITLE TEST |
|---|---|---|---|---|---|---|---|---|
| | | | | | | DATE 96.10.21 | | DRAWING NO. ZUMEN–1111 |

FIG.25

| No. | SIGNAL NAME | DRAWING NUMBER | ADDRESS | REMARKS | No. | SIGNAL NAME | DRAWING NUMBER | ADDRESS | REMARKS |
|---|---|---|---|---|---|---|---|---|---|
| 1 | CLK | (1) | D-2 | | 39 | | | | |
| 2 | CLK | (2) | C-2 | | 40 | | | | |
| 3 | CLK | (3) | A-5 | | 41 | | | | |
| 4 | CLK | (4) | B-1 | | 42 | | | | |
| 5 | CLK | (5) | D-5 | | 43 | | | | |
| 6 | | | | | 44 | | | | |
| 7 | ADDR[0:5] | (2) | A-5 | | 45 | | | | |
| ... | | | | | ... | | | | |
| 37 | | | | | 75 | | | | |
| 38 | | | | | 76 | | | | |

| REF. N. | DATE | REVISION | | BY | CHKD. BY | APPRV. BY | DESIGND BY | | DRAWN BY |
|---|---|---|---|---|---|---|---|---|---|
| | | | | | NEXT ASS'Y | | DATE | 96.10.21 | |
| | | | | | TITLE | TEST | | | |
| | | | | | DRAWING NO. | | ZUMEN – 1111 | | |

FIG.26

| SUPPLY NUMBER | ABBREVIATION | MODEL NAME | QUANTITY | REFERENCE SYMBOL | | | | | | | |
|---|---|---|---|---|---|---|---|---|---|---|---|
| AA1111 | P-ROM | QQ-4321 | 1 | Q857 | | | | | | | |
| BB2222 | TTL LOGIC | RR-8888 | 6 | Q16 | Q17 | Q18 | Q235 | Q236 | Q24 | Q25 | Q26 |
| CC3333 | TTL LOGIC | RR-7777 | 12 | Q19 | Q20 | Q21 | Q22 | Q23 | Q24 | | Q101 Q102 |
| | | | | Q723 | Q724 | | | | | | |
| DD4444 | TTL LOGIC | SS-6666 | 1 | Q201 | | | | | | | |
| EE5555 | TTL LOGIC | SS-5555 | 2 | Q52 | Q176 | | | | | | |
| FF6666 | CMOS LOGIC | TT-4444 | 3 | Q41 | Q560 | Q661 | | | | | |
| GG7777 | DIGITAL SWI | UU-3333 | 1 | Q82 | | | | | | | |
| HH8888 | XTAL ISC. | VV-2222 | 1 | Q356 | | | | | | | |

| REF. N. | DATE | REVISION | BY | NEXT ASS'Y | APPRV. BY | CHKD. BY | DESIGN BY | DRAWN BY | TITLE<br>TEST |
|---|---|---|---|---|---|---|---|---|---|
| | | | | | | | DATE 96.10.21 | | DRAWING NO.<br>ZUMEN-1111 |

FIG.27

| COLUM NUMBER | | 1 | | 2 | | 3 | | 4 | | 5 | | 6 | | 7 | | 8 | | 9 | | 10 | |
|---|---|---|---|---|---|---|---|---|---|---|---|---|---|---|---|---|---|---|---|---|
| PRODUCT NUMBER (UNIT NUMBER) | | ZUMEN 1111 | | ZUMEN 1112 | | ZUMEN 1113 | | ZUMEN 1114 | | ZUMEN 1115 | | | | | | | | | | | |
| SUPPLY NUMBER | PART NAME | QTY. | QTY. | QTY. | QTY. | QTY. | QTY. | QTY. | QTY. | QTY. | QTY. |
| XX-1234 | AL CAPACITOR | 10 | 10 | 10 | 10 | 10 | | | | | |
| XX-5678 | CERA CAPACITOR | 3 | 3 | 2 | 2 | 2 | | | | | |
| YY-1234 | ZENER DIODE | 2 | 2 | 2 | 2 | 2 | | | | | |
| YY-5678 | TTL LOGIC | 8 | 8 | 9 | 9 | 9 | | | | | |

| REF.N.DATE | REVISION | BY | APPRV. BY | CHKD. BY | DRAWN BY | TITLE TEST |
|---|---|---|---|---|---|---|
| | | | | DATE 96.10.21 | | DRAWING NO. ZUMEN – 1111 |

FIG.35

```
Management:
  FileType="PPDL"
  Mode=Prototype
  DrawingNo="ABC0000"
  Title="PartsSel-Test"
  Date="95/10/24"
  NextAssy=();
EndManagement;

PDL:FormatVersion=V1
    Date="95-11-25"

ProducedBy=PDL_vI.0;

PartsInf MaxParts=3;
  Parts PID=1;
    Attr CNo=A000000
        A="ROM(JP)" M="MMM."
        MT="TTT" S="256Kbit" ;
  EndParts:
  Parts PID=2;
    Attr CNo=A000001
        A="REGISTER" M="NNN"
        MT="RRR" S="10K,1/4W" ;
  EndParts;
  Parts PID=3;
    Attr CNo=A000002
        A="CAPACITOR" M="OOO"
        MT="CCCC" S="10u,50V" ;
  EndParts;
EndPartsInf;

CompInf:MaxComp=3;
  Product UNo=(ABC0000);
  Comp CPID=1 PID=1 K=R C=("1");
  Comp CPID=2 PID=2 K=I C=("1");
  Comp CPID=3 PID=3 K=R C=("1");
  CompList:RevisionNo=0;
    Rev:MaxRev=0;
    EndRev;
    List:No=S401;
      Position:MaxLine=1;
        Line Pos=1 CPID=1;
      EndPosition;
    EndList;
  EndCompList;
EndCompInf;
```

```
ColRef CNID=1 UNo="ABC0000"  MaxRef=3;
  Ref RID=1;
    Attr L=Q1 PID=1
         O=M K=YES D=E;
  EndRef;
  Ref RID=2;
    Attr L=Q1 PID=2
         O=M K=YES D=E;
  EndRef;
  Ref RID=3;
    Attr L=Q1 PID=3
         O=M K=YES D=E;
  EndRef;

RefList:RevisionNo=0;
    Rev:MaxRev=0;
    EndRev;
  List:No=A701;
    Position:MaxLine=3;
      Line Pos=1 RID=1 PID=3;
      Line Pos=2 RID=2 PID=3;
      Line Pos=3 RID=3 PID=3;
    EndPosition;
  EndList;
  EndRefList;
  MntList:RevisionNo=0;
    Rev:MaxRev=0;
    EndRev;
  List:No=AB01;
    Position:MaxLine=3;
      Line PosY=1 PosX=1 RID=1;
      Line PosY=2 PosX=1 RID=2;
      Line PosY=3 PosX=1 RID=3;
    EndPosition;
   EndList;
   EndMntList;
  EndColRef;
EndPDL;
```

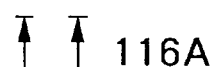
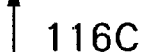

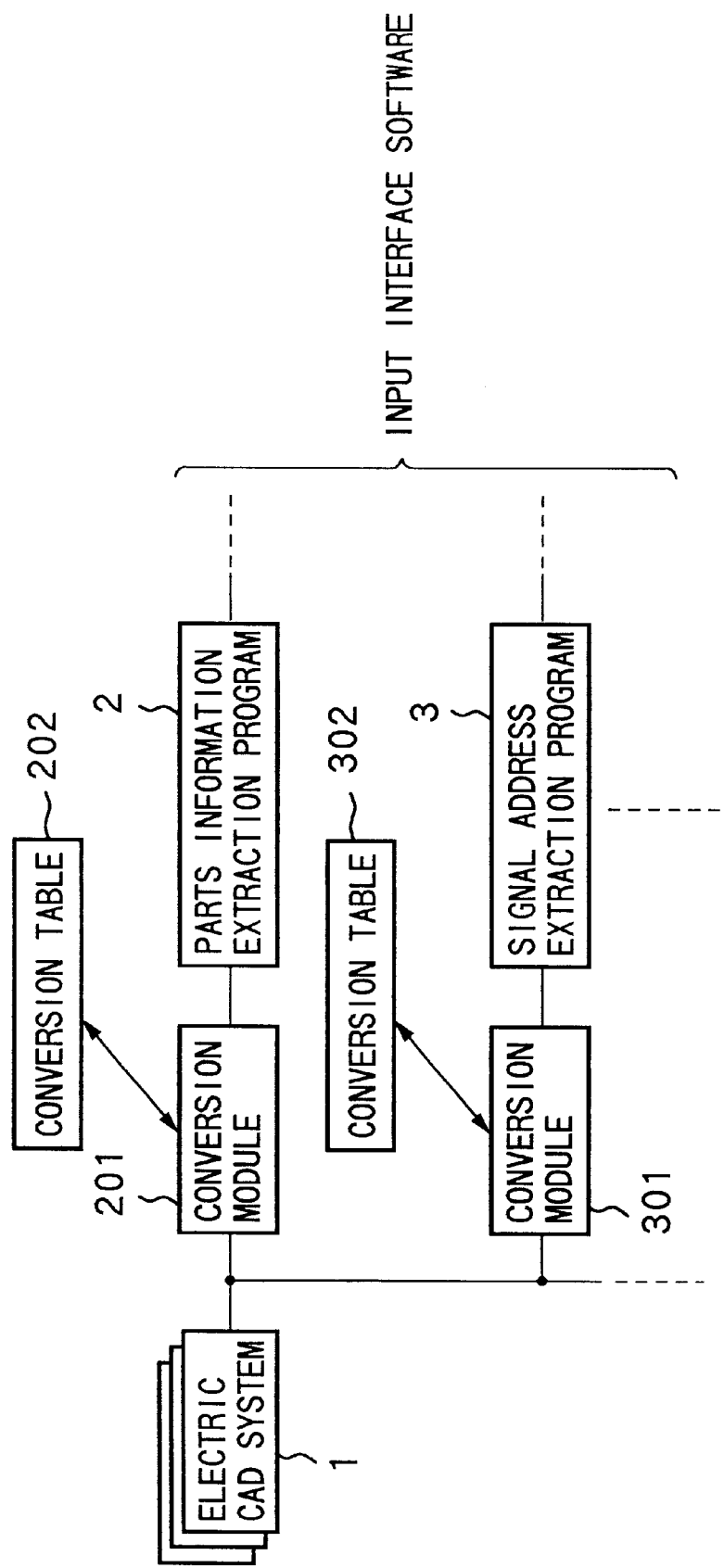

PARTS SELECTION APPARATUS AND PARTS SELECTION SYSTEM WITH CAD FUNCTION

BACKGROUND OF THE INVENTION

The present invention relates to a parts selection apparatus and parts selection system for selecting individual parts to assemble a product or semi-finished product using a computer.

Conventionally, a system that searches a database in which a plurality of parts are registered in advance and selects parts that satisfy desired conditions is disclosed in, e.g., Japanese Laid-Open Patent No. 7-254002.

In general, in a design procedure using such system, actual parts to be used in the manufacture corresponding to the individual components in design drawing data generated by an external CAD system are selected on the basis of desired conditions. Information associated with the selected specific part is reflected in (added to) the design drawing data, and information required for placing an order for the selected part is extracted. Then, generation of slips and drawings, and the like are done. For example, a CAD system for designing electronic circuits as a typical CAD system will be explained below with reference to FIGS. 1 and 2.

FIG. 1 is an explanatory view of the arrangement of circuit diagram data according to a prior art and shows an example wherein data of a circuit in a given unit in the manufacture such as a single printed circuit board or the like is divisionally generated as a plurality of circuit diagram data 51. In FIG. 1, reference numerals 52 and 53 denote graphic symbols indicating circuit elements, i.e., a resistor and capacitor, respectively. The respective symbols are connected via lines, as shown in FIG. 1. R1, C1, and the like are reference symbols assigned by the designer when he or she designed the circuit diagram to identify the individual circuit elements. A required rated value is defined beside each reference symbol. In the circuit diagram data in this state, a plurality of gate circuit elements, integrated circuit elements, or the like, which are a single part in an actual product, are often separately defined by a plurality of circuit diagram data 51 for the sake of convenience for the designer in design.

FIG. 2 is a flow chart for explaining the process flow in the manufacture of a printed circuit board according to the prior art, and steps S1 to S12 in FIG. 2 will be described in turn below.

Step S1: A circuit diagram is created by a CAD system.

Step S2: It is checked (design rule check: DRC) if the circuit diagram is correctly designed. More specifically, it is checked if items (rated values, and the like) required for selecting specific parts in a process later are input for the individual components (graphic symbols of circuit elements, the like) defined in circuit diagram data, and electrical wiring is correctly done, and so on.

Step S3: Graphic symbols that become a single part of separately defined circuit diagram elements are packaged and a single reference symbol is assigned.

Step S4: Predetermined items are extracted from the circuit diagram data 51 to search a plurality of pieces of part information pre-stored in a database, thus selecting parts to be used. More specifically, the rated values, supply numbers, or the maker's names and maker model names of the parts to be used are selected. Note that the supply number is an identification number which is defined for each part in the manufacturer which is to manufacture that printed circuit board, and is used upon ordering parts to the respective part manufacturers. Hence, in the mass-production of that printed circuit board, supply numbers are selected.

Step S5: Information associated with each selected part is added to the circuit diagram data 51 (to be referred to as back annotation: BA hereinafter).

Step S6: Actual shapes of a plurality of parts re-stored in the database are searched out on the basis of the information associated with the selected parts, and design data of a printed circuit board (PCB) is created.

Step S7: Layout of the printed circuit board in the actually assembled state of the individual parts is designed.

Step S8: Reference symbols are changed on the printed circuit board in the actually assembled state of the individual parts, so that the individual parts are easy to find. Also, the changed information is reflected in the circuit diagram data 51 to attain matching between the PCB manufacturing data and the circuit diagram data.

Step S9: Slips used in a supply department and manufacturing department are generated.

Step S10: Circuit diagrams and slips are plotted to distribute them in the form of paper sheets.

Step S11: After checking and approval, the plotted drawings and slips are delivered to the subsequent processes (supply department and manufacturing department).

In the above-mentioned prior art, information of each component defined in the design drawing data is extracted, a specific part is selected, and information associated with that specific part must be written again in the design drawing data. Conventionally, since this processing is provided with a specific CAD system, the parts selection system depends on the structure of design drawing data created by that CAD system and consequently corresponds to the specific CAD system. Hence, in an environment in which a plurality of types of CAD systems are used, since different data types (binary, text, and the like), formats, variable names, and the like are used in units of systems, a plurality of types of parts selection systems are required in correspondence with these CAD systems. As a result, it is hard to learn operations of such systems, and parts selection data with different formats are present, thus making data management and part supply difficult. Upon outputting slips and drawings in the manufacturing department or supply department as the subsequent process, since many factors depend on the specific CAD systems used in the design process, a slip in a required format cannot be obtained.

SUMMARY OF THE INVENTION

It is, therefore, an object of the present invention to provide a parts selection apparatus which is independent from the data structure of a design drawing, and a parts selection system with a CAD function.

In order to achieve the above object, a parts selection apparatus of the present invention is characterized by the following arrangement.

That is, there is provided a parts selection apparatus for selecting parts that make up a product from database means which registers information associated with a plurality of parts, comprising information extraction means for extracting information of a predetermined item from external information and generating selection information to be processed by the parts selection apparatus, parts selection means for selecting, from the database means, a part in accordance with the selection information generated by the information extraction means, and writing the selection result in the selection information, and information output means for outputting the selection information in which the selection result is written by the parts selection means, wherein a plurality of pairs of information extraction means and information output means equivalent to the information extraction means and the information output means are arranged in correspondence with external information generated in different formats, and can be selected in accordance with the format of the external information.

The information output means preferably outputs the selection information in which the selection result is written by the parts selection means to the external information.

For example, the information extraction means comprises related information extraction means for extracting reference symbols assigned to individual parts and their related information included in the external information, description format conversion means for converting a description format unique to the external information to a description format to be processed by the parts selection apparatus, and selection information edit means having a function of generating new selection information on the basis of information converted by the description format conversion means and a function of matching the new selection information generated by the function and existing selection information.

The apparatus preferably further comprises drawing information generation means for generating drawing information on the basis of the selection information, and drawing output means for outputting the drawing information output from the drawing information generation means, and a plurality of drawing output means equivalent to the drawing output means are arranged, and are selected in correspondence with a target output method.

For example, the parts selection apparatus is a parts selection apparatus for selecting parts that make up a printed circuit board, and the apparatus further comprises printed circuit board design information generation means for generating printed circuit board design information on the basis of the selection information, and interface means for interfacing the information generated by the printed circuit board design information generation means to an external printed circuit board design apparatus, and a plurality of interface means equivalent to the interface means are arranged in correspondence with external printed circuit board design apparatuses that process information in different formats, and are selected in accordance with a target external printed circuit board design apparatus.

In order to achieve the above object, a parts selection system of the present invention is characterized by the following arrangement.

That is, there is provided a parts selection system which comprises design means for designing a product, and parts selection means for selecting parts that make up the product from database means which registers information associated with a plurality of parts, wherein the parts selection means comprises information extraction means for extracting information of a predetermined item from design information generated by the design means, and generating selection information to be processed by the parts selection apparatus, parts selection means for selecting, from the database means, a part in accordance with the selection information generated by the information extraction means, and writing the selection result in the selection information, and information output means for outputting the selection information in which the selection result is written by the parts selection means, and a plurality of pairs of information extraction means and information output means equivalent to the information extraction means and the information output means are arranged in correspondence with the design information generated in different formats, and can be selected in accordance with design means of the design information.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 6 shows a menu window used for selecting software functions in the parts selection system according to the embodiment of the present invention;

FIGS. 8A and 8B are flow charts showing extraction of part information according to the embodiment of the present invention;

FIG. 9 is a table for explaining different data descriptions according to the embodiment of the present invention;

FIG. 16 shows a panel used for setting the search condition upon executing parts selection according to the embodiment of the present invention;

FIG. 21 shows a main window of a title column input program according to the embodiment of the present invention;

FIG. 23 shows an example of a drawing table according to the embodiment of the present invention;

FIG. 24 shows an example of a reference symbol table according to the embodiment of the present invention;

FIG. 25 shows an example of a signal address table according to the embodiment of the present invention;

FIG. 26 shows an example of an assembly specification according to the embodiment of the present invention;

FIG. 27 shows an example of a component parts table according to the embodiment of the present invention;

FIG. 35 shows an example of parts selection data according to the embodiment of the present invention;

FIG. 36 shows an example of parts selection data according to the embodiment of the present invention; and FIG. 37 is a diagram for explaining a modification of the embodiment of the present invention.

DETAILED DESCRIPTION OF THE PREFERRED EMBODIMENTS

A parts selection apparatus and parts selection system with a CAD function according to the present invention will be described in detail hereinafter with reference to the accompanying drawings.

Hardware Arrangement

Figure 3:
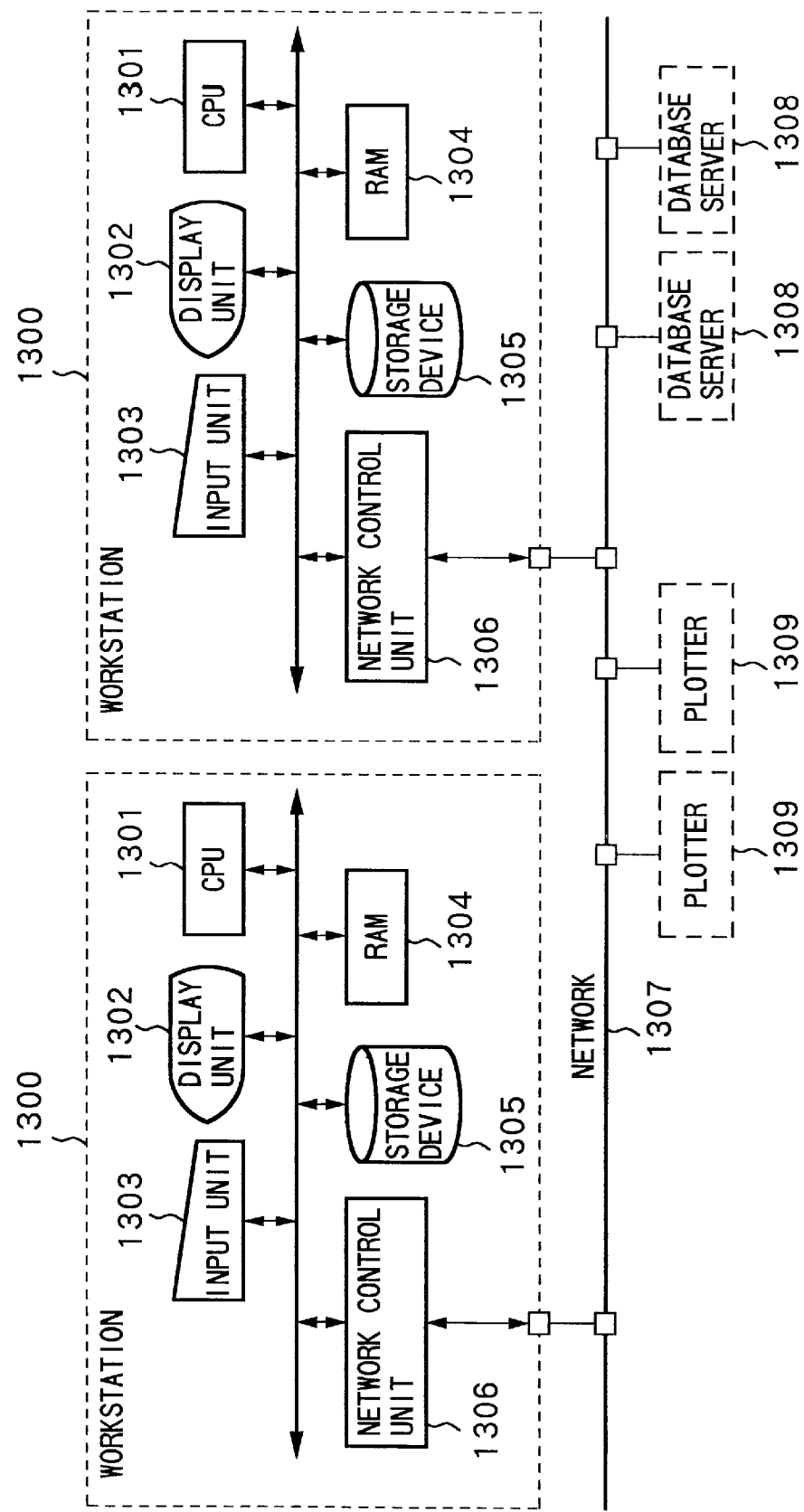
FIG. 3 is a schematic block diagram showing the arrangement of a parts selection system according to an embodiment of the present invention.
Figure 4:
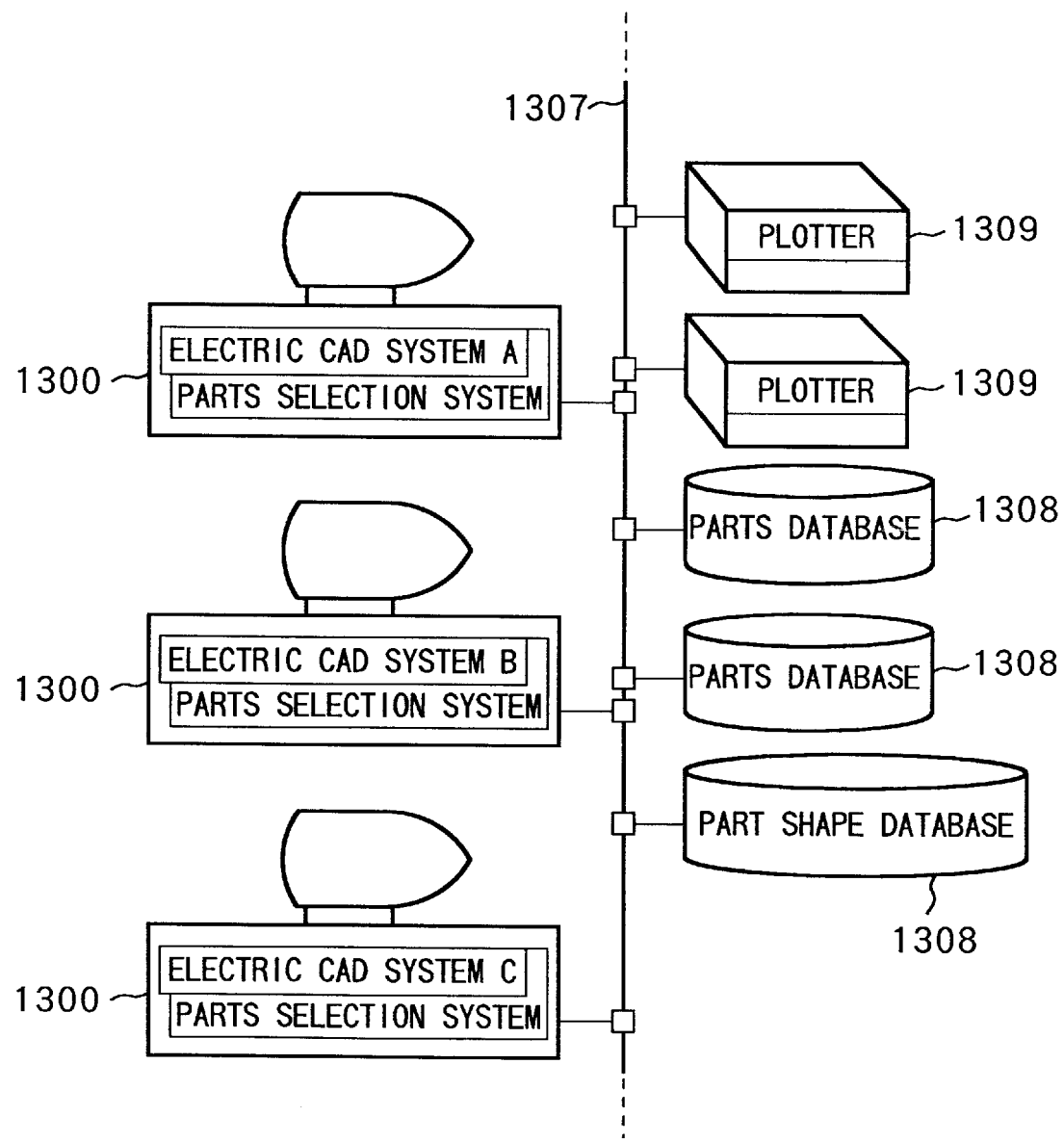
FIG. 4 is a diagram showing an application example of the parts selection system according to the embodiment of the present invention.

FIGS. 3 and 4 show the hardware arrangement of this system.

FIG. 3 is a schematic block diagram showing the arrangement of a parts selection system according to an embodiment of the present invention.

In FIG. 3, a plurality of workstations 1300 serving as parts selection apparatuses, database servers 1308, and plotters (printers) 1309 are connected to a network 1307 to communicate with each other.

Each workstation 1300 comprises a CPU 1301 for making various arithmetic operations and conditional decisions by executing command codes stored in an external storage device 1305 and the like, a display unit 1302 such as a CRT for displaying characters and figures, an input unit 1303 including a mouse, keyboard, and the like, a RAM 1304 serving as an internal storage device which is used as storage areas of various parameters and a work area, the storage device 1305 such as a hard disk for storing a program group and data associated with parts selection (to be described later), and a network control unit 1306 for controlling communications via the network 1307.

Note that the program group and data to be executed by the CPU 1301 may be stored in the storage device 1305 of the workstation used by the operator, the database server 1308 serving as an external storage device, or the storage device 1305 of another workstation 1300, and may be transferred via the network 1307 as needed upon executing a program. Also, data changed in the RAM 1304 may be transferred to and stored in the database server 1308 or the storage device 1305 of another workstation 1300 via the network 1307 as needed.

FIG. 4 shows an application example of the parts selection system according to the embodiment of the present invention.

In FIG. 4, for example, workstations 1300 comprising different electric CAD systems (A, B, and C), two plotters 1309, and three database servers 1308 are connected to the network 1307. The database servers 1308 are used as a parts database that stores the rated values, supply numbers, maker's names, maker's types, and the like of a plurality of parts, and a parts database that stores the shapes of a plurality of parts. A plurality of different databases may be stored in a single server in place of such three servers.

Software Configuration

The software configuration of this system will be explained below. The outline of software in this system will first be described with reference to FIGS. 5A to 5C. Note that data processing and operations will be described later.

Figure 5A:
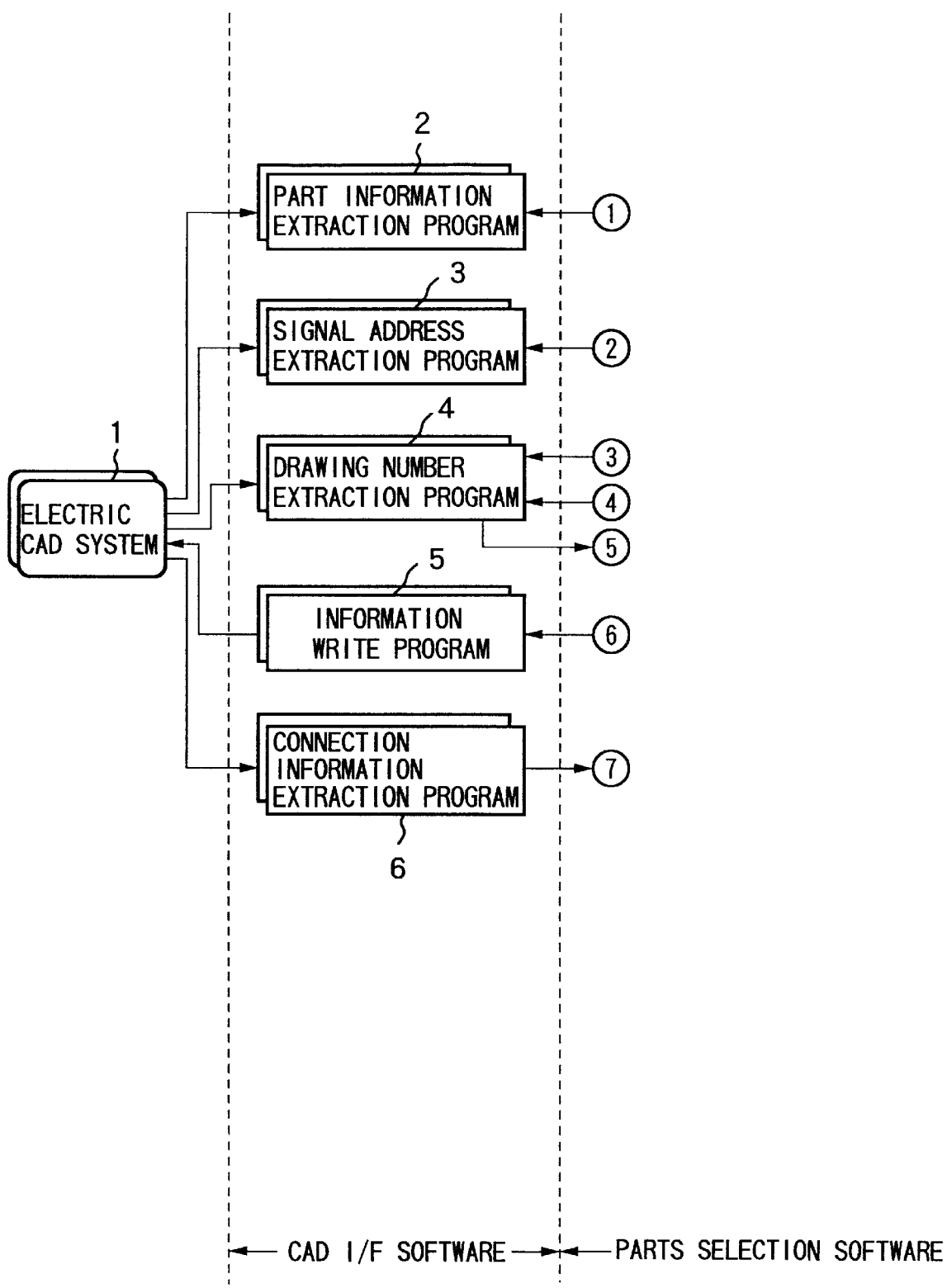
FIGS. 5A to 5C are schematic diagrams showing software in the parts selection system according to the embodiment of the present invention.
Figure 5B:
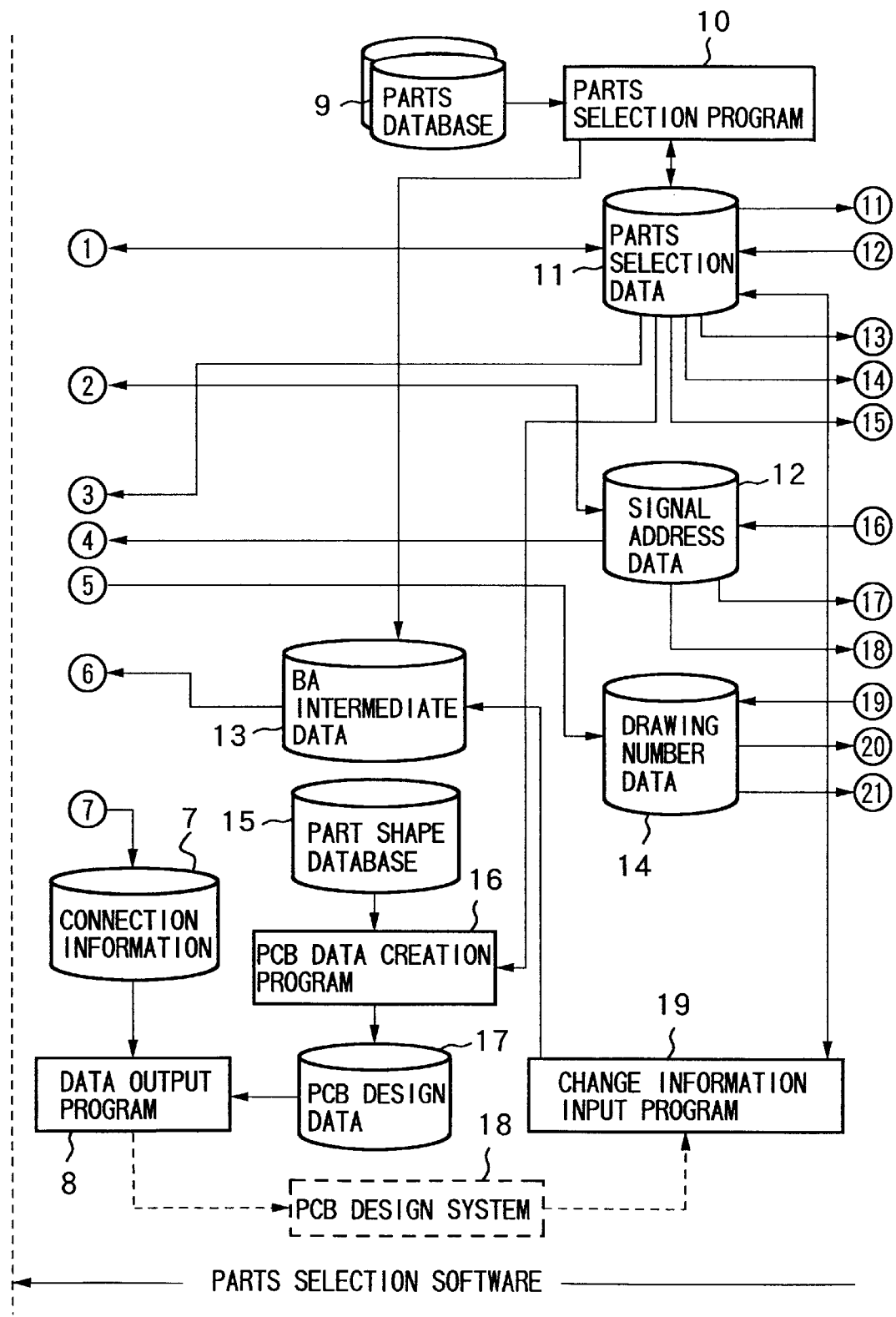
Figure 5C:
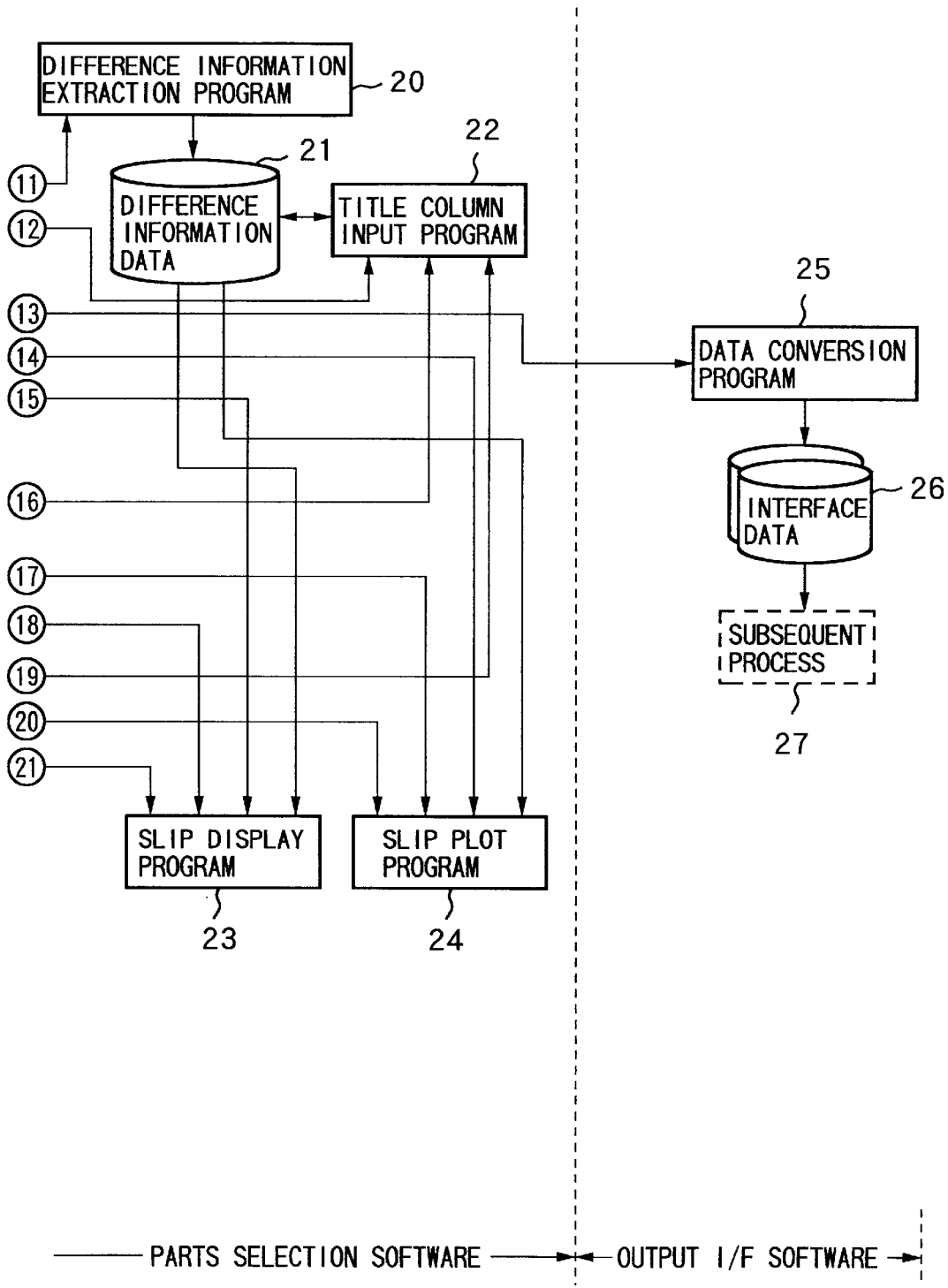

FIGS. 5A to 5C are diagrams showing the outline of the software in the parts selection system according to the embodiment of the present invention. The solid arrows indicate the flows of data in this system. Also, the broken arrows indicate the flows of data outside this system.

In FIGS. 5A to 5C, the software of this system is roughly classified into the following portions.

Electric CAD system: Electric CAD systems that create circuit diagram data and have different data structures (in this embodiment, the workstations 1300 comprise the electric CAD systems, as shown in FIG. 4, but an electric CAD system built by an external stand-alone workstation may be used). In this embodiment, assume that circuit diagram data created by each electric CAD system has the arrangement shown in FIG. 1.

CAD Interface Software: A program group that implements processing for extracting data of predetermined items used in parts selection software from the individual electric CAD systems, and implements processing for adding data obtained by the parts selection software to the individual electric CAD systems. As the characteristic feature of the present invention, a plurality of program groups are prepared in correspondence with the individual electric CAD systems, and when the operator selects circuit diagram data of the electric CAD system to be subjected to parts selection, the corresponding program group is started.

Parts selection Software: A program group for performing parts selection, slip output, and the like on the basis of data of predetermined items.

Output Interface Software: A program group for converting information associated with the selected parts output from the parts selection software into a different data format used in a subsequent process, and outputting the converted information.

As described above, the parts selection software is present as an independent system which is functionally separated from the individual CAD systems by the CAD interface software, and is also separated from the subsequent process by the output interface software.

The programs and data shown in FIGS. 5A to 5C will be described below.

CAD Interface Software

Part Information Extraction Program 2

It extracts reference symbols, rated values, and the like as predetermined items for parts selection from the target circuit diagram data, and generates parts selection data 11 serving as a criteria of parts selection. When the parts selection data 11 is already present, new data is merged with the data 11 while preferentially using the current target circuit diagram data. Note that generation of the parts selection data 11 will be described later.

Signal Address Extraction Program 3

It extracts data used for generating a signal address table described in a predetermined format from the target circuit diagram data, and outputs the extracted data to signal address data 12. Note that the signal address table describes signal names described in the circuit diagram data, and the display positions of the corresponding signals in the circuit diagram data, which positions are expressed by English letters and numerals assigned to-a drawing frame in, e.g., the circuit diagram data 51 shown in FIG. 1, and the designer and the manufacturing department use it as a list of signals in the circuit. FIG. 25 shows an example of the signal address table according to the embodiment of the present invention.

Drawing Number Extraction Program 4

It extracts the drawing number of a given circuit diagram from the target circuit diagram data, also extracts the drawing number of a slip from parts selection data and signal address data, and outputs drawing number data 14 used for creating a drawing table.

FIG. 23 shows an example of the drawing table according to the embodiment of the present invention. The drawing table describes a list of drawing numbers associated with a given unit, and is used for managing drawings and slips.

Information Write Program 5

It converts an intermediate file (corresponding to information of the selected parts to be used in practice) stored in BA intermediate data 13 into the format of the current target circuit diagram data and back-annotates the converted data.

Connection Information Extraction Program 6

It extracts a net list from the target circuit diagram data, and outputs it to connection information 7.

Parts selection Software

Parts selection Program 10

It searches a parts database 9 as the database server 1308 (FIG. 4) on the basis of reference symbols, rated values, and the like stored in the parts selection data 11 by the part information extraction program 2 so as to support selection of the parts to be used in practice. Information associated with the selected parts is stored in the parts selection data 11, and is also output to the BA intermediate data 13 as an intermediate file to be back-annotated to the target circuit diagram data.

Difference Information Extraction Program 20

It extracts the difference between two parts selection data 11 and outputs it to difference information data 21. For example, parts selection data created for certain circuit diagram data may be updated later owing to changes in design, revisions of circuit diagrams, and the like. In such case, the parts selection data before and after update are compared to extract their difference. When the extracted difference information is output by a slip plot program 24, the output information is especially helpful for those who take part in the subsequent process.

Title Column Input Program 22

It is used by the operator to simultaneously enter characters and numerals to the title columns of the respective slips and drawings generated based on the parts selection data 11, signal address data 12, drawing number data 14, and difference information data 21.

Slip Display Program 23

It converts the parts selection data 11, signal address data 12, drawing number data 14, and difference information data 21 into predetermined images of slips and drawings, and displays them on the display unit 1302. The data converted by this program can also be displayed on a WWW browser.

Slip Plot Program 24

It converts the parts selection data 11, signal address data 12, drawing number data 14, and difference information data 21 using agents corresponding to description languages (e.g., HPGL, LISP, PostScript (tradename), and the like), and prints the converted data as predetermined slips and drawings using a desired plotter 1309. In a preferred embodiment, computers which are connected to the network 1307 and each of which comprises a slip plot program 24 may be equipped in sections that require slips, so as to output slips.

Figure 22:
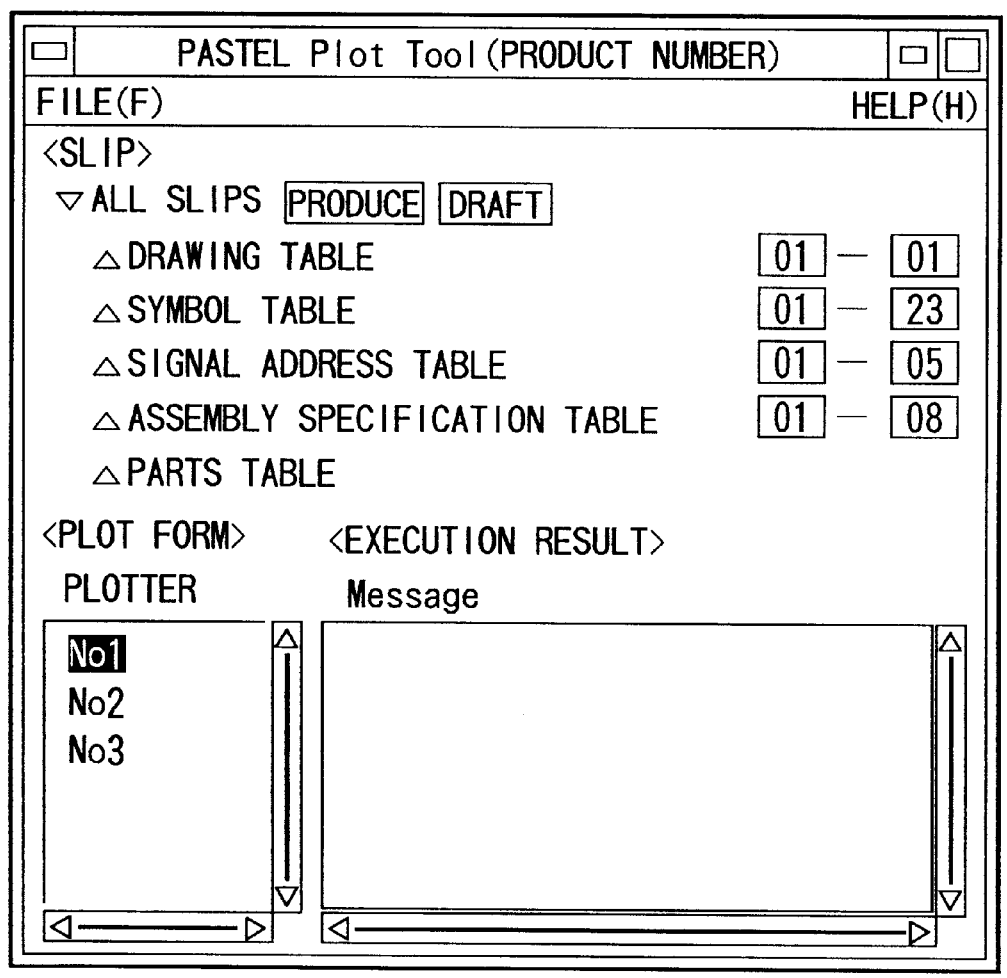
FIG. 22 shows a main window of a slip plot program according to the embodiment of the present invention.

FIG. 22 shows the main window of the slip plot program according to the embodiment of the present invention. Although a detailed description will be omitted, items corresponding to the drawings to be printed on the left side on the main window are selected, and the finals of the drawing number are input to the input areas on the right side, thus obtaining the following slips.

Drawing Table (FIG. 23): A slip that describes drawings required for assembling a unit.

Reference Symbol Table (FIG. 24): A slip that describes parts required for assembling a certain unit using reference symbols as keys.

Signal Address Table (FIG. 25): A slip that describes the locations of signal names described in a circuit diagram.

Assembly Specification (FIG. 26): A slip that describes reference symbols using, as keys, the supply numbers of parts selected by the system of this embodiment.

Component Parts Table (FIG. 27): A slip that describes the quantities required for assembling a certain unit using, as keys, the supply numbers of parts selected by the system of this embodiment.

Note that the plotter which outputs these slips can be selected on the main window.

PCB Data Creation Program 16

It searches a part shape database 15 as the database server 1308 (FIG. 4) on the basis of the supply numbers or maker model names of parts stored in the parts selection data 11 to extract the actual shapes of the corresponding parts, and outputs the extracted shape data to PCB design data 17 together with the information extracted from the parts selection data.

Data Output Program 8

It outputs the net list stored in the connection information 7, and the PCB design data 17 to a storage medium such as a floppy disk, and transfers them to a PCB design system 18 via the network 1307.

PCB Design System 18

The PCB design system 18 is an external system in this embodiment, and makes a manufacturing design of a PCB, in which the individual parts are actually assembled, on the basis of the net list and PCB design data 17 acquired via the storage medium or the network 1307. In this case, the system 18 re-assigns reference symbols to easily find the individual parts even on the assembled PCB. The change information of the reference symbols is input to a change information input program 19.

Change Information Input Program 19

It reads change information of the reference symbols and the like generated in the PCB design system 18, and merges it with the parts selection data 11. Also, it outputs the change information to the BA intermediate data 13 to back-annotate it to the target circuit diagram data of the electric CAD system 1.

Output Interface Software

Data Conversion Program 25

It converts the parts selection data 11 into a different data format used by a subsequent process 27, and outputs it to interface data 26. The manufacturing or supply department as the subsequent process 27 outputs slips and drawings with reference to the interface data 26 that has been converted into the data format used by the own department. More specifically, when data is transferred to a system that can process data in only a data format used so far, a data conversion program for converting the data into that data format is used. On the other hand, when data is transferred to a system that runs PCB inspection tests (so-called in-circuit tests), a data conversion program for converting the data into a data format which can be read by that system is used. When data is transferred to a PCB design system that cannot read the data format of the PCB design data 17 which can be generated by the system of this embodiment, a data conversion program for converting the data into a data format which can be read by that system is used.

Data Processing and Operation

Principal data processing and operations of the above-mentioned software programs will be explained below.

Selection of Software Function

Figure 7:
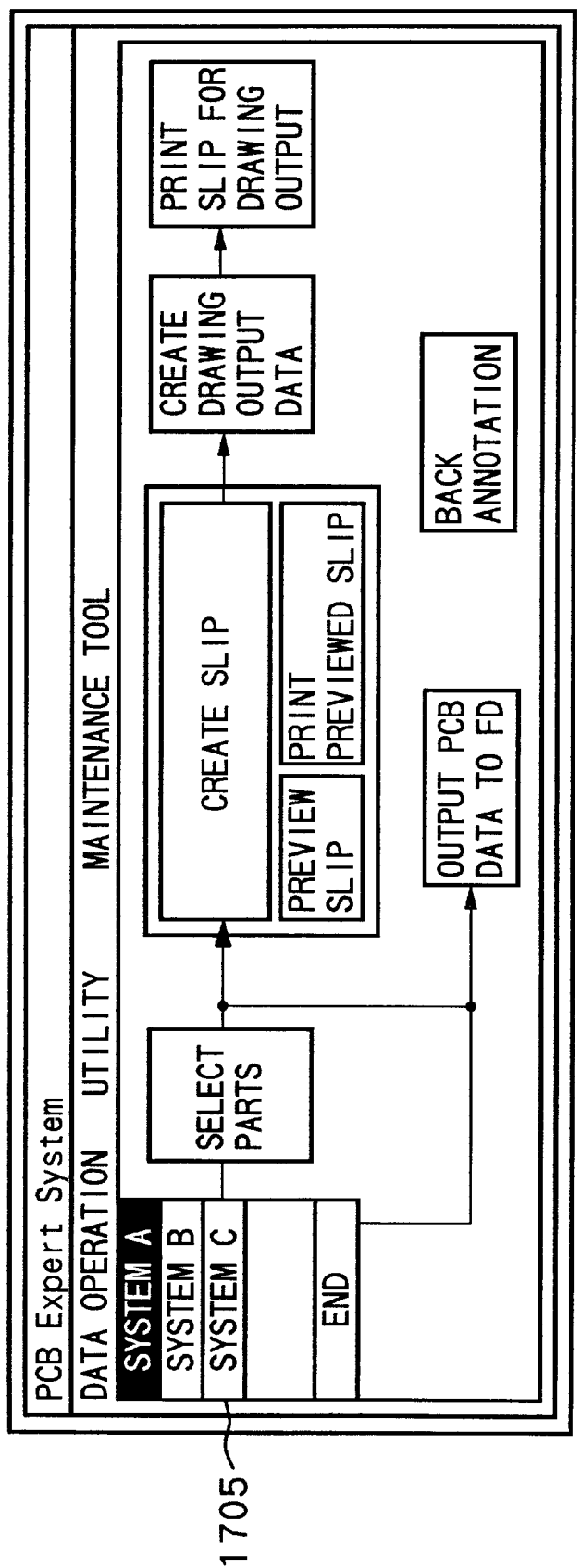
FIG. 7 shows the menu window used for selecting software functions in the parts selection system according to the embodiment of the present invention (a pull-down menu is being displayed)

FIGS. 6 and 7 show the menu window for selecting a software function in the parts selection system according to the embodiment of the present invention. With this window, the operations of the entire software of the system of this embodiment are managed.

In FIGS. 6 and 7, reference numeral 1701 denotes a menu bar, from which the individual items are selected to execute various operations associated with the entire system. The operator operates [data operation] on the menu bar 1701 to display a pull-down menu 1705, as shown in FIG. 7, and selects one of the electric CAD systems (A, B, C), thereby selecting a corresponding interface program from a setting file 17011. When the operator clicks an area 1702, the electric CAD system selected by the above-mentioned operation is executed.

When the operator clicks an area 1703, the currently selected part information extraction program 2 is executed to extract predetermined items from the target circuit diagram data, thus generating parts selection data 11. Subsequently, the parts selection program 10 is started to select parts, and upon completion of selection, the information write program 5 is started to add the information associated with the selected parts to the current target circuit diagram data.

When the operator clicks an area 1705, the currently selected signal address extraction program 3 and drawing number extraction program 4 are started in turn to generate signal address data and drawing number data. After that, the title column input program 22 is executed, and outputs the input title column information to the parts selection data 11, signal address data 12, and drawing number data 14.

When the operator clicks an area 1704, the slip display program 23 is executed, and the created slip (e.g., one of FIGS. 23 to 27) is displayed on the display unit 1302.

When the operator clicks an area 1706, the slip plot program 24 is executed, and the created slip (e.g., one of FIGS. 23 to 27) is output from the plotter 1309.

When the parts selection data 11 is converted into a different data format, and the converted data is output to the interface data 26, the operator operates [utility] on the menu bar 1701 to display a pull-down menu (not shown), and selects a desired one of a plurality of types data conversion programs exemplified above in the paragraphs of the data conversion program 25. When the operator clicks an area 1707, the selected data conversion program 25 is executed, and plot data whose data format has been converted is copied from a work data holding area to a plot data holding area and the interface data 26.

When the operator clicks an area 1708, the slip plot program 24 is executed to output the slip to be output to the subsequent process, and the created slip is output from the plotter 1309.

When the operator clicks an area 1709, the currently selected connection information extraction program 6 is executed, and the PCB data creation program 16 is executed. After that, by executing the data output program 8, data used in the PCB design system 18 is output via, e.g., a floppy disk.

When the operator clicks an area 1710, the change information input program 19 is executed, and the currently selected information write program 5 is executed, so that change information of reference symbols and the like generated in the PCB design system 18 is merged with the parts selection data 11 and is back-annotated to the target circuit diagram data of the electric CAD system.

Part Information Extraction Program 2

The part information extraction program 2 extracts, as predetermined items, data indicating reference symbols, rated values, and graphic symbols, supply numbers, and maker model names from circuit diagram data of the electric CAD system corresponding to that part information extraction program. Of these items, the supply numbers and maker model names are extracted if they are already added to that circuit diagram data. Note that part information extraction must be done on the premise-that the circuit diagram data has already been packaged by the electric CAD system, and proper reference symbols are assigned to the individual graphic symbols on the circuit diagram. Part information extraction will be explained below with reference to FIGS. 8A and 8B, and examples of the rules for that processing will be explained below with reference to FIGS. 28 to 33.

Figure 8A:
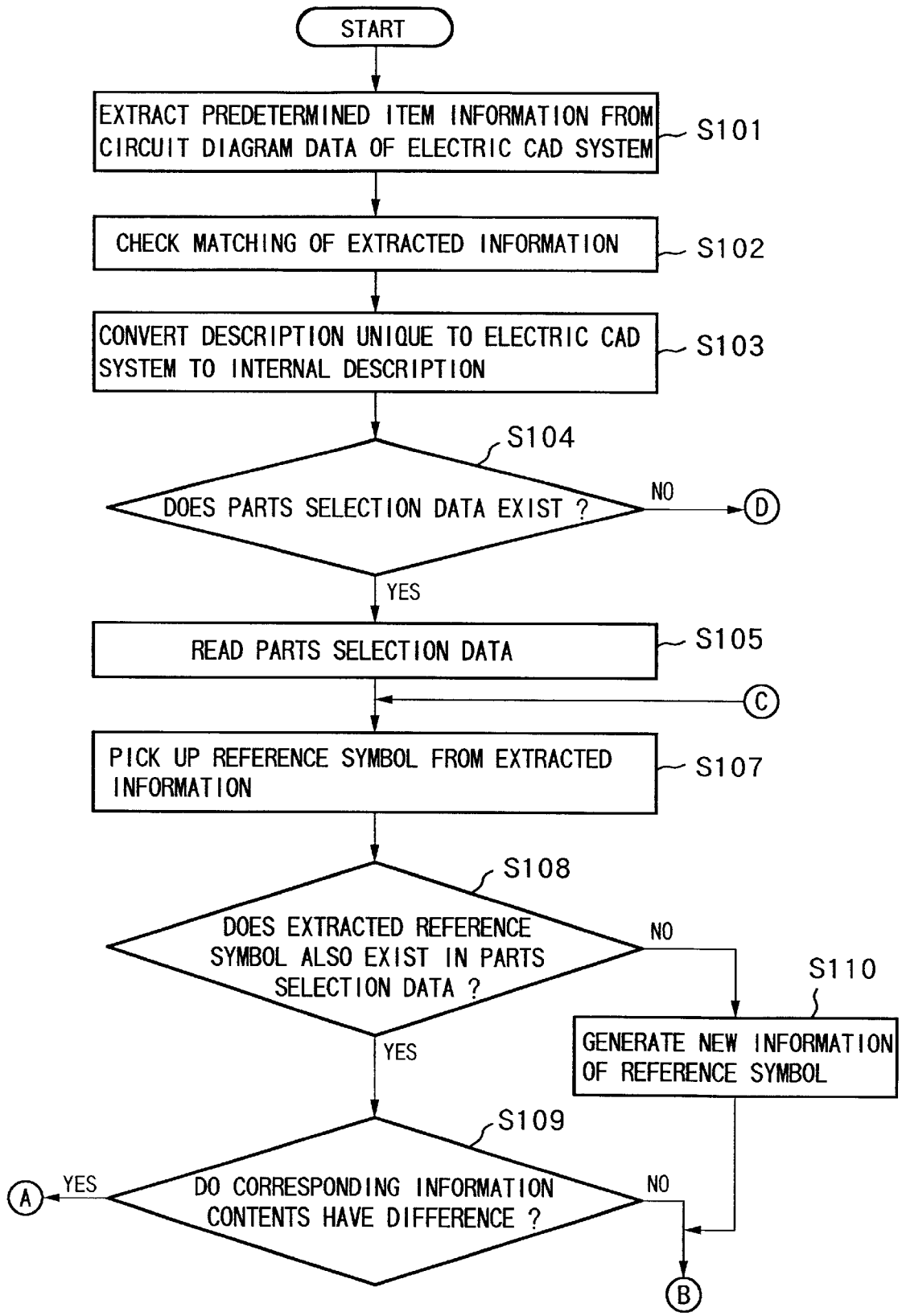

FIGS. 8A and 8B are flow charts showing part information extraction according to the embodiment of the present invention.

In FIG. 8A, when the part information extraction program 2 is started, information of each predetermined item described above is extracted from the circuit diagram data (step S101). Subsequently, mismatching among the information contents of items appended to an identical reference symbol is checked, a message is output for a mismatching item if such item is found, and processing continues with that item as a blank item (step S102). Thereafter, descriptions (data types, formats, variable names, and the like) unique to the electric CAD system corresponding to the part information extraction program 2 are converted into common ones in the parts selection system. For example, FIG. 9 is a table for explaining different data descriptions. As shown in FIG. 9, unit symbols 201 that are adopted in the electric CAD system, and use English capital letters complying with JIS X01240, are converted into normal descriptions using English small letters (step S103).

In step S104, it is checked if parts selection data 11 already exists. If NO in step S104, new reference symbol information is generated from the information extracted in step S101 (step S106) On the other hand, if YES in step S104, that data is read from the parts selection data 11 (step S105), and mismatching between the information currently extracted in step S101, and the existing parts selection data is detected by the processing in step S107 and the subsequent steps.

Steps S107 to S113 form a routine for detecting mismatching between the currently extracted information and the existing parts selection data, and mismatching is detected by picking up reference symbol information one by one from the currently extracted information.

A reference symbol is picked up from the extracted information (step S107), and it is checked if the picked-up reference symbol is also included in the parts selection data 11 (step S108). If NO in step S108, i.e., if that reference symbol is a new one, the information of the reference symbols is created in the parts selection data 11 (step S110), and the flow advances to step S113.

On the other hand, if YES in step S108, i.e., if that reference symbol is already included in the parts selection data 11, mismatching among the contents of information (rated value, supply number, and the like) appended to those reference symbols is checked (step S109). If mismatching is not detected, the flow advances to step S113. On the other hand, if mismatching is detected in step S109, the information already present in the parts selection data 11 is rewritten with the currently extracted information (step S111), and the column of that reference symbols is set in an unsettled state (step S112). Note that the unsettled reference symbol is displayed in a different display color as a circuit symbol for which a part must be selected by the processing of the parts selection program 10 (the details will be explained later with reference to FIG. 10).

In step S113, it is checked if all the pieces of extracted information are processed. If NO in step S113, the flow returns to step S107 to continue the processing for the next reference symbol. On the other hand, if YES in step S113, it is checked if reference symbols included in the parts selection data 11 exist in the information extracted in step S101, i.e., whether or not a graphic symbol was deleted from the circuit diagram data and the corresponding reference symbol has disappeared, (step S114). If YES in step S114, data is output to the parts selection data 11 (step S116). On the other hand, if NO in step S114, i.e., if a reference symbol has disappeared, the information of the corresponding reference symbol is deleted from the parts selection data 11 (step S115), and the flow advances to step S116.

FIGS. 28 to 33 are views for explaining the rules in part information extraction according to the embodiment of the present invention. Assume that a plurality of reference symbols Q1 taken as an example are used in given circuit diagram data.

Figure 28:
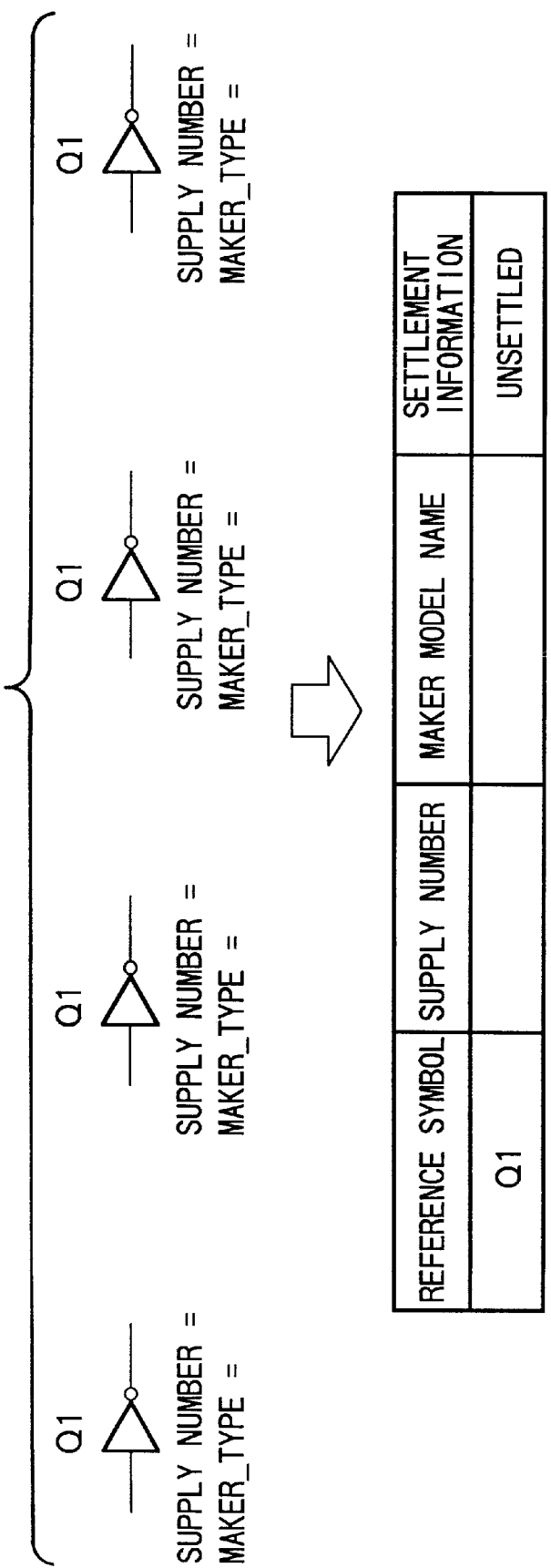
FIG. 28 is a view for explaining the rules in part information extraction according to the embodiment of the present invention.

1) FIG. 28: When information (supply number, maker model name, or the like) associated with a part is not added to a reference symbol extracted from the circuit diagram data, the reference symbol alone is output to the parts selection data 11, and an [unsettled state] indicating that selection of a part is not complete is set.

Figure 29:
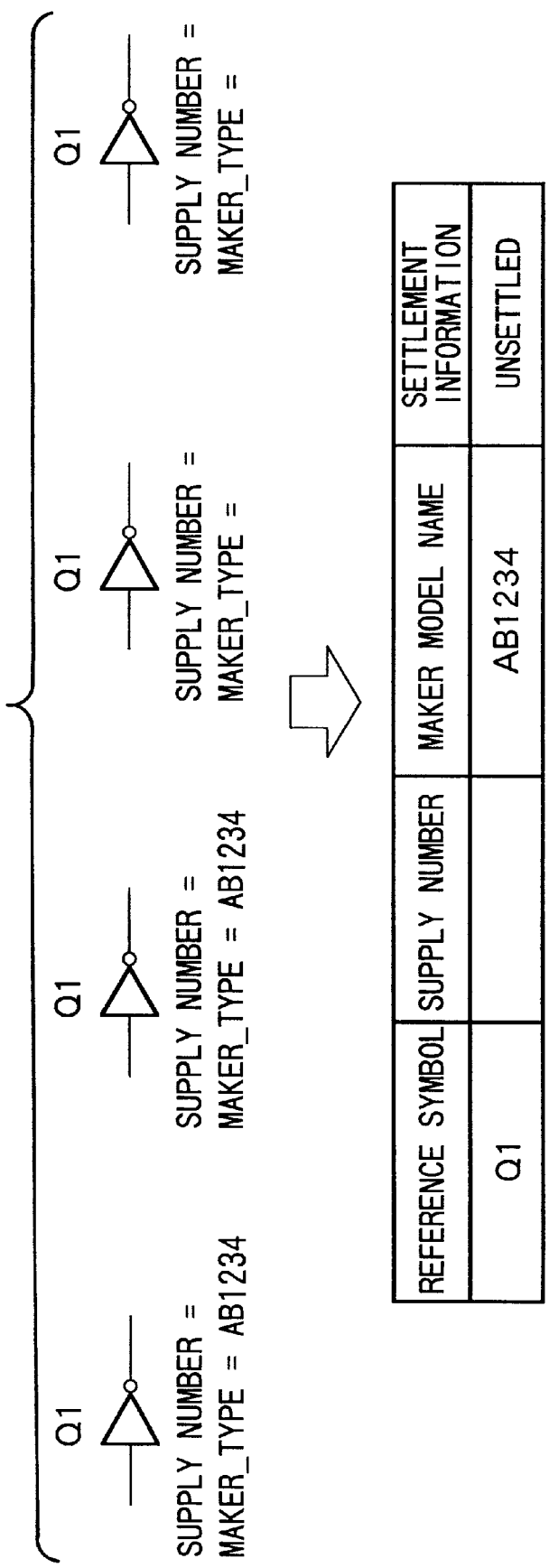
FIG. 29 is a view for explaining the rules in part information extraction according to the embodiment of the present invention.

2) FIG. 29: When information associated with an identical part is added to some of reference symbols extracted from the circuit diagram data and no information is added to other reference symbols, the reference symbol and information associated with that part are output to the parts selection data 11, and an [unsettled state] indicating that selection of a part is not complete is set.

Figure 30:
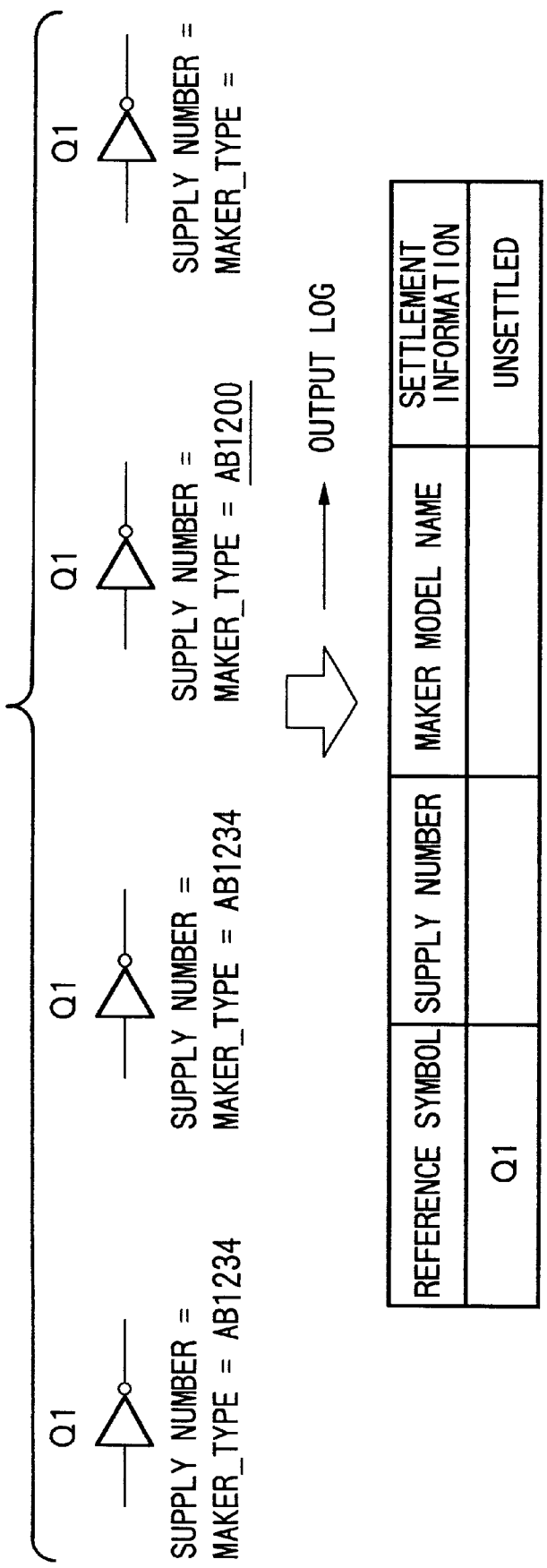
FIG. 30 is a view for explaining the rules in part information extraction according to the embodiment of the present invention.

3) FIG. 30: When different information contents associated with parts are added to some of reference symbols extracted from the circuit diagram data, the reference symbol alone is output to the parts selection data 11, and an [unsettled state] indicating that selection of a part is not complete is set. Also, a log is output.

Figure 31:
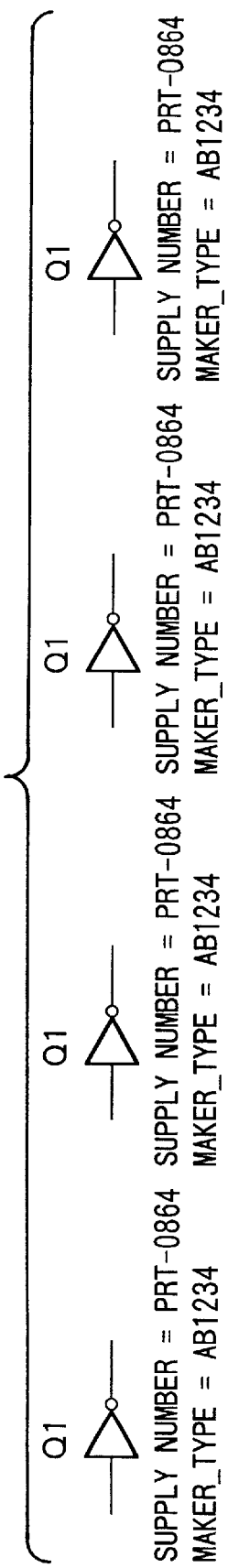
FIG. 31 is a view for explaining the rules in part information extraction according to the embodiment of the present invention.

4) FIG. 31: When a reference symbol and information associated with a part of that reference symbol extracted from the circuit diagram data match those in the parts selection data 11, the contents of the settlement information column in the parts selection data are left unchanged. For example, if the contents indicate a [settled state], the [settled state] remains set.

Figure 32:
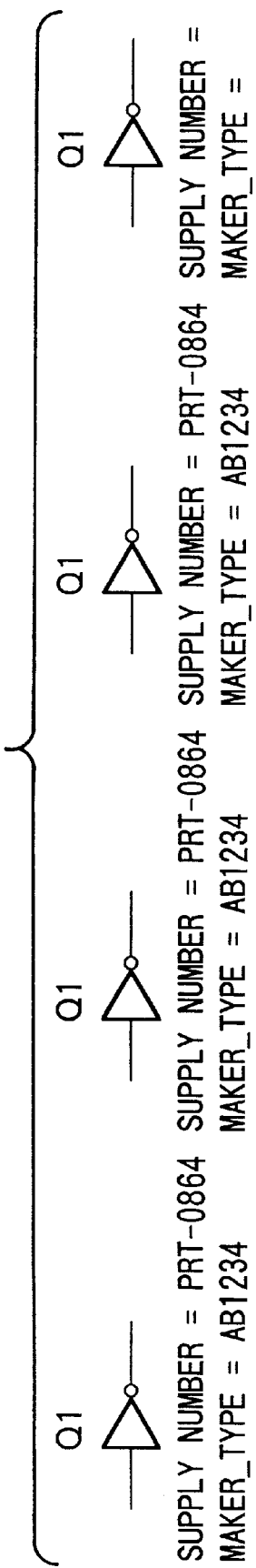
FIG. 32 is a view for explaining the rules in part information extraction according to the embodiment of the present invention.

5) FIG. 32: When a reference symbol and information associated with a part of that reference symbol extracted from the circuit diagram data are different from those in the parts selection data 11, the reference symbol and its information are replaced by those extracted from the circuit diagram data, and an [unsettled state] indicating that selection of a part is not complete is set.

Figure 33:
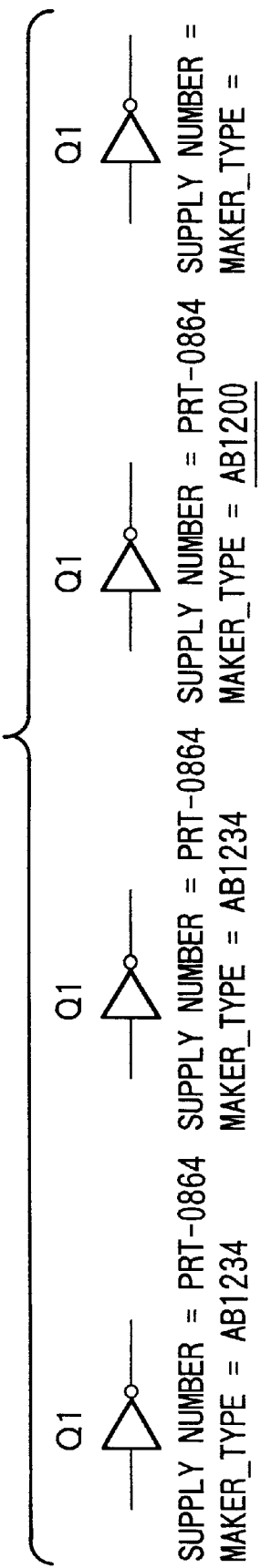
FIG. 33 is a view for explaining the rules in part information extraction according to the embodiment of the present invention.

6) FIG. 33: When information associated with a different type of part is added to a reference symbol extracted from the circuit diagram data, the reference symbol alone is output to the parts selection data 11, and an [unsettled state]

indicating that selection of a part is not complete is set. Also, a log is output.

Parts selection Program 10

Parts selection support processing by the parts selection program 10 will be explained below. A main window serving as a start point upon selecting a part will first be explained.

Figure 10:
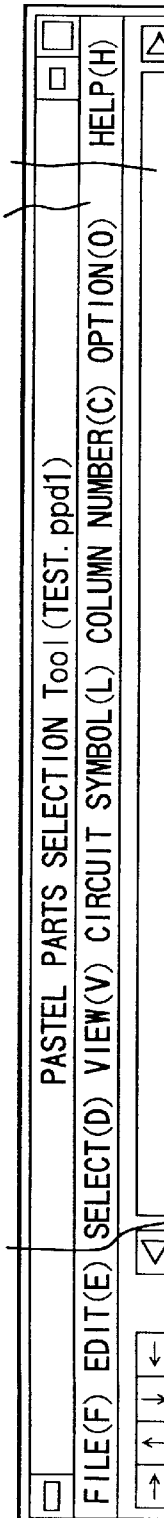
FIG. 10 shows a main window of a parts selection program according to the embodiment of the present invention.

FIG. 10 shows the main window of the parts selection program according to the embodiment of the present invention, and this window is displayed when the operator clicks the parts selection area 1703 in FIG. 6 above.

In FIG. 10, reference numeral 301 denotes a menu bar with which the operator designates an item to display a pull-down menu, and also designates an item in the pull-down menu to execute various functions in the program. Reference symbols extracted from the current target data of the electric CAD system 1 are displayed in a display area 302. Information such as a supply number, rated value, and the like corresponding to each reference symbol in the display area 302 is displayed in a display area 303. The display area 303 displays the supply number, abbreviation, rated value, maker, and type. When the information volume is large and all the pieces of information cannot be displayed within the display areas 302 and 303, some pieces of information are displayed, and the display position can be moved using scroll bars 304 and 305. A simple message from the program is displayed on a display area 306. When a cell in the display area 303 is designated, that cell becomes a selected cell, and the value in that cell is displayed in an edit area 307 and can be edited. Information input or changed in the edit area 307 is reflected in the value of the selected cell when the return key is pressed.

The display areas 302 and 303 display reference symbols and their information for which parts selection has already been done (settled state) in black, and those for which parts selection is not done yet (unsettled state) in red. In FIG. 10, reference symbols Q29, R1 to R6, and the like are not subjected to parts selection yet and are unsettled, and only information extracted from the circuit diagram data is displayed.

Data Structure of Parts selection Data 11

Figure 34:
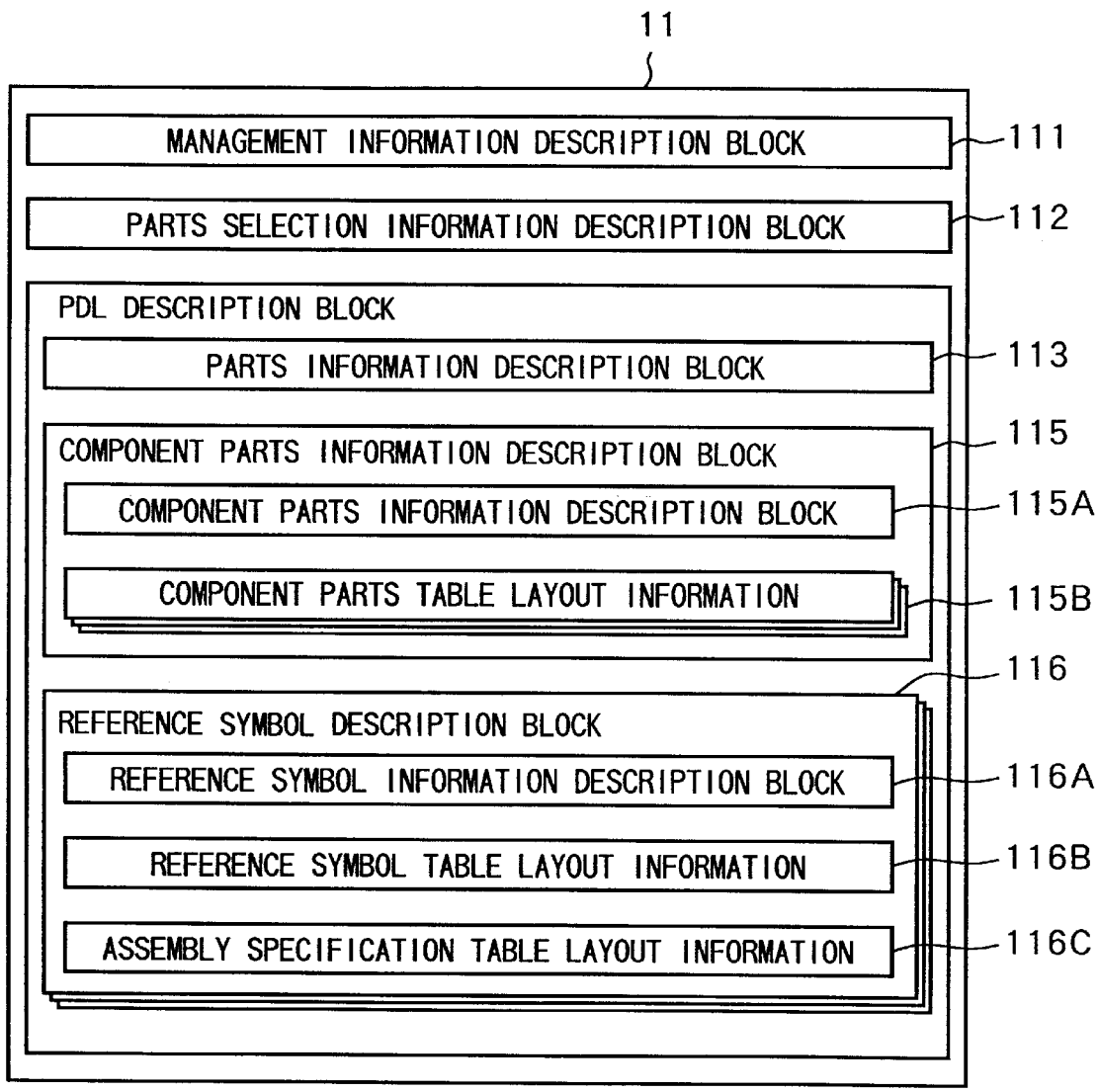
FIG. 34 is a view for explaining the data structure of parts selection data according to the embodiment of the present invention.

FIG. 34 is a view for explaining the data structure of the parts selection data according to the embodiment of the present invention.

In FIG. 34, the parts selection data 11 is made up of the following blocks:

Management Information Description Block 111: It describes management information such as the date of creation, creator, approver, and the like of that parts selection data.

Parts selection Information Description Block 112: It describes a machine name including the parts database to be searched, search condition, and the like.

Part Information Description Block 113: It describes data associated with parts such as the rated values, maker's name, maker model names, and the like of the individual selected parts.

Component Parts Information Description Block 115: It describes the start statement of a component parts information description block, the number of described parts, and the like.

Component Parts Information Description Block 115A: It describes additional information associated with the selected parts.

Component Parts Table Layout Information 115B: It describes layout information of the component parts table.

Reference Symbol Description Block 116: It describes the start statement of a reference symbol information description block 116A, the number of described parts, and the like.

Reference Symbol Information Description Block 116A: It describes information associated with reference symbols.

Reference Symbol Table Layout Information 116B: It describes layout information of the reference symbol table.

Assembly Specification Layout Information 116C: It describes layout information of the assembly specification.

FIGS. 35 and 36 show an example of the data structure of the parts selection data having the above-mentioned blocks.

FIGS. 35 and 36 show an example of parts selection data according to the embodiment of the present invention (note that FIGS. 35 and 36 show single parts selection data).

A multiple search and parts selection as detailed operations of parts selection using the main window shown in FIG. 10 will be explained below.

Multiple Search

A multiple search will first be briefly described. The parts database 9 is searched on the basis of information displayed in the display area 303 in correspondence with each reference symbol displayed in the display area 302. The multiple search is done for a plurality of reference symbols selected by the operator on the main window. As a result, when one part is found from the parts database 9 in correspondence with one selected reference symbol, part information of the found part is displayed in the display area 303 of that reference symbol and is set in the settled state. Also, the part information is registered in the parts selection data 11. On the other hand, when a plurality of parts are found or when no part is found under the given search condition, the unsettled state is set. This operation will be described in detail below.

Figure 11:
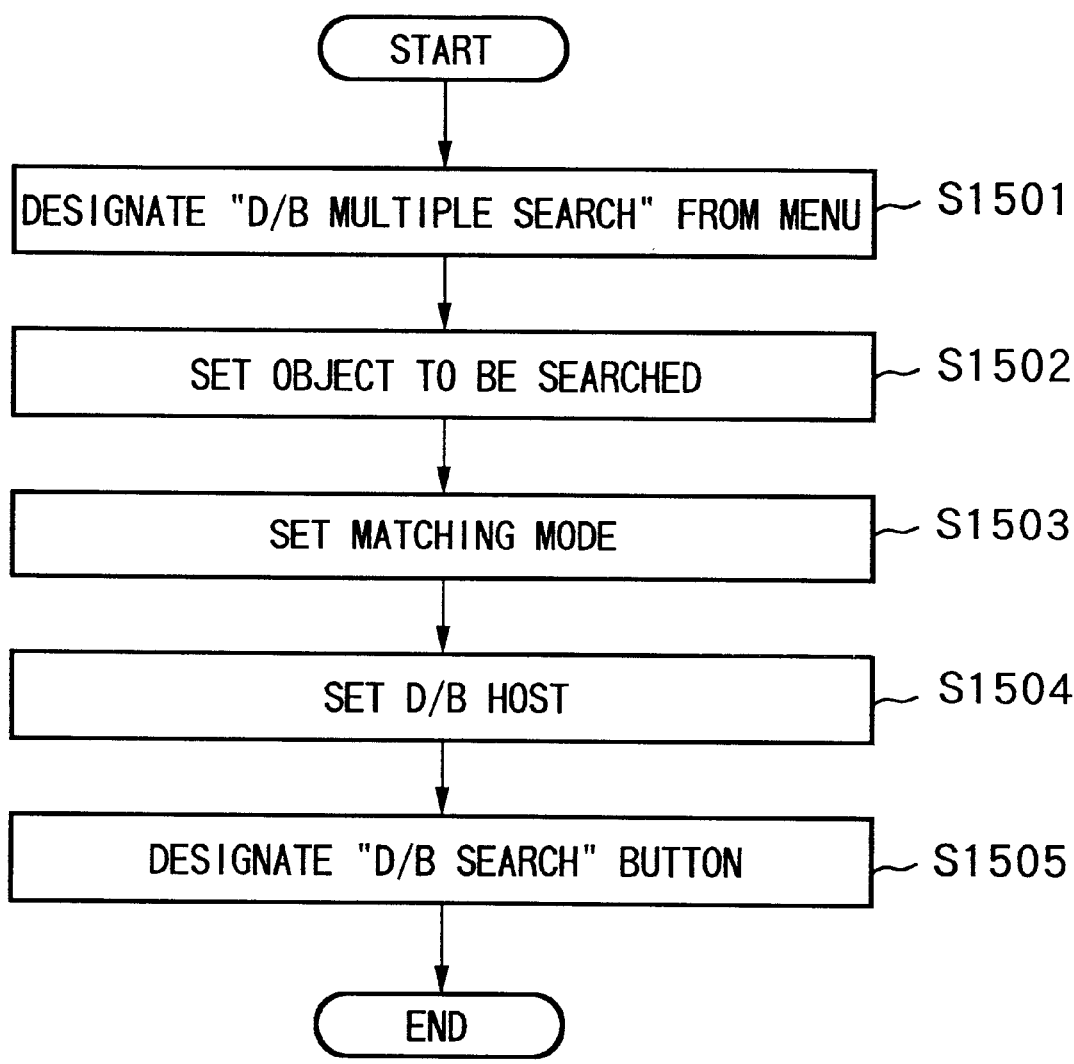
FIG. 11 is a flow chart showing an example of the multiple search procedure according to the embodiment of the present invention.

FIG. 11 is a flow chart showing an example of the multiple search procedure according to the embodiment of the present invention.

Figure 13:
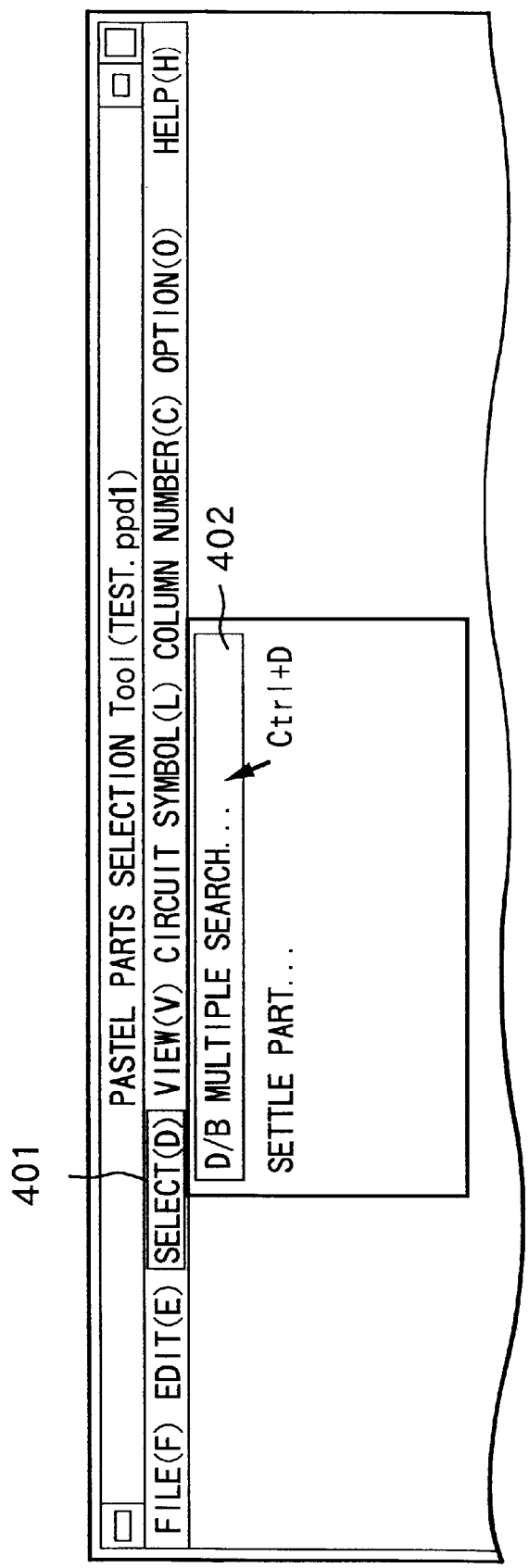
FIG. 13 shows a menu displayed upon executing a multiple search according to the embodiment of the present invention.

FIG. 13 shows a menu displayed upon executing a multiple search according to the embodiment of the present invention.

Figure 14:
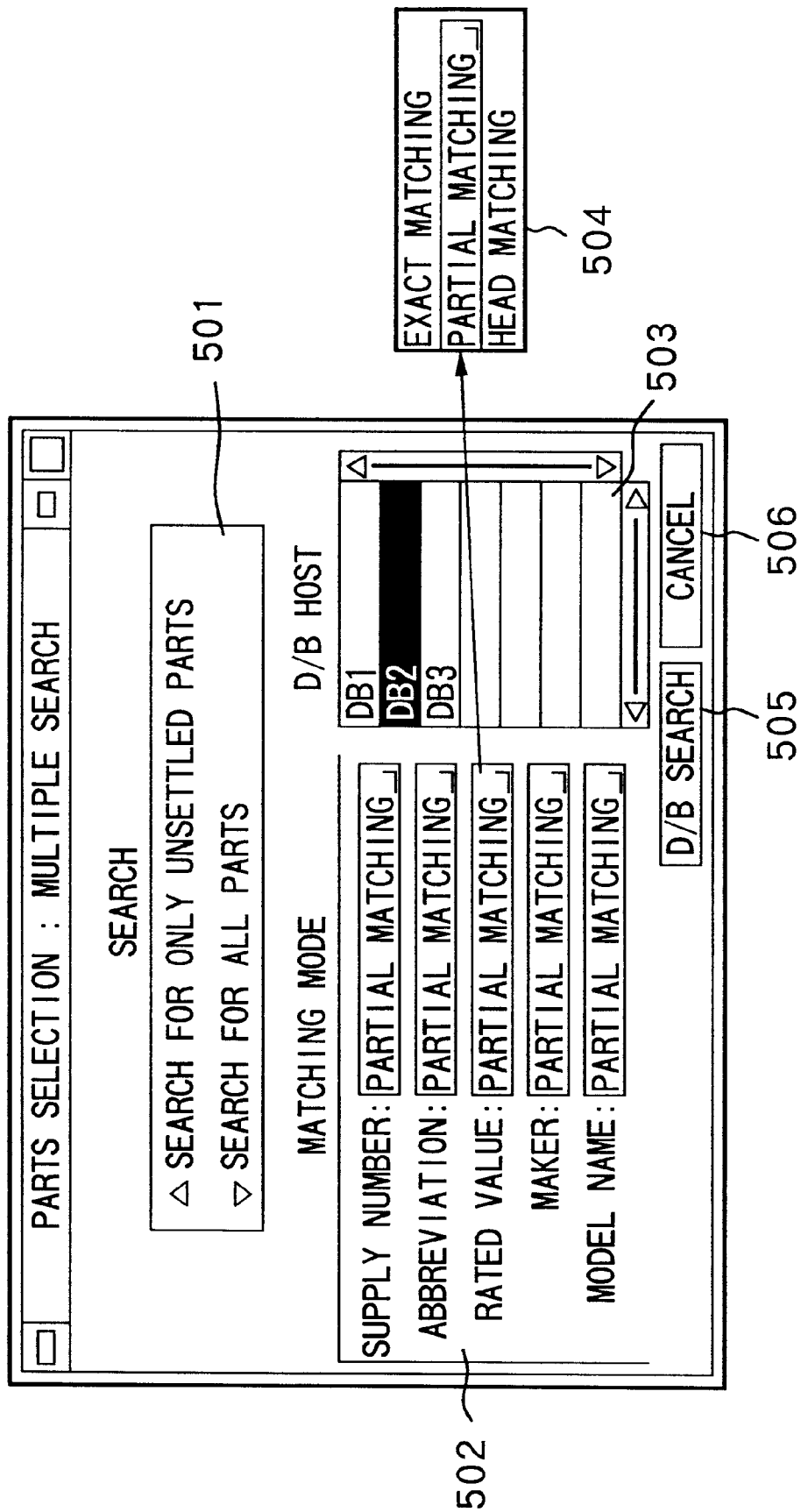
FIG. 14 shows a panel used for setting the search condition upon executing a multiple search according to the embodiment of the present invention.

FIG. 14 shows a panel used for setting the search condition upon executing a multiple search according to the embodiment of the present invention.

Step S1501: The operator designates a "D/B multiple search" item 402 from a pull-down menu displayed by selecting a "selection" item 401 on the menu bar shown in FIG. 13. Then, the panel shown in FIG. 14 is displayed.

Step S1502: The operator selects the object to be searched for from "search for only unsettled parts" and "search for all parts" by clicking corresponding characters on a display area 501 on the panel shown in FIG. 14.

Step S1503: The operator determines the matching mode (search condition) upon searching the parts database 9 in units of items corresponding to those in the display area 303 in FIG. 10. The initial value is "partial matching". When the operator designates a button beside each item name in a display area 502, an option menu 504 is displayed. From this menu, the operator can select, as the search condition, one of "exact matching" for designating exact matching with conditions, "partial matching" for designating partial matching with conditions, and "head matching" for designating matching with head data of conditions.

Step S1504: The operator selects a host computer that comprises the parts database 9 to be searched from a list in a display area 503.

Step S1505: When the operator designates an operation button 505, a multiple search is executed under the conditions set in the above-mentioned procedure. When one part is selected for one reference symbol upon executing the multiple search, and the state of the reference symbol has changed from unsettled to settled, the display color of that information is changed from red to black. Also, the number of reference symbols whose states have changed from unsettled to settled is displayed in the display area 306 on the main window. On the other hand, when a plurality of parts are found or when no part is found under the given search condition, the unsettled state is set. To cancel the search or to close the panel shown in FIG. 14, a cancel button 506 is designated.

In a preferred embodiment, when a plurality of candidates are found for one reference symbol, the priority order of selection may be registered in advance, and a part may be automatically selected in accordance with that order. Note that the next candidate must be selected in the priority order, for example, when a part with highest priority is temporarily not available for some cause. In such case, a flag which can identify whether or not each part can be currently automatically selected is required for each part in the parts database 9.

Parts Selection

The outline of parts selection will first be described. In parts selection, the parts database 9 is searched for a part corresponding to one reference symbol selected by the operator. As a result, when a plurality of search results are obtained, they are displayed. When the operator selects one part, the selected part is settled as that of the corresponding reference symbol. This operation will be described in detail below.

Figure 12:
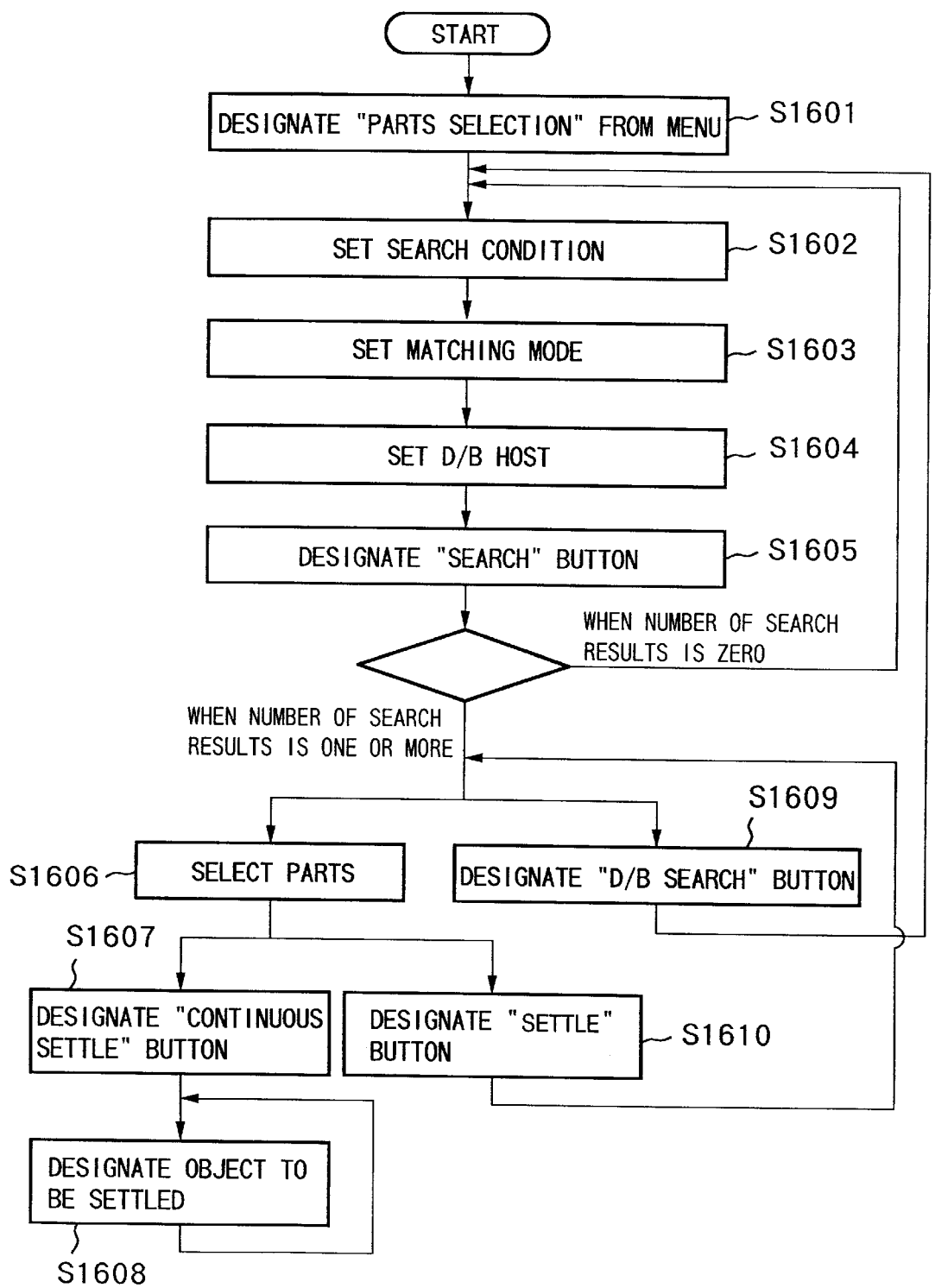
FIG. 12 is a flow chart showing an example of the parts selection procedure according to the embodiment of the present invention.

FIG. 12 is a flow chart showing an example of the parts selection procedure according to the embodiment of the present invention.

Figure 15:
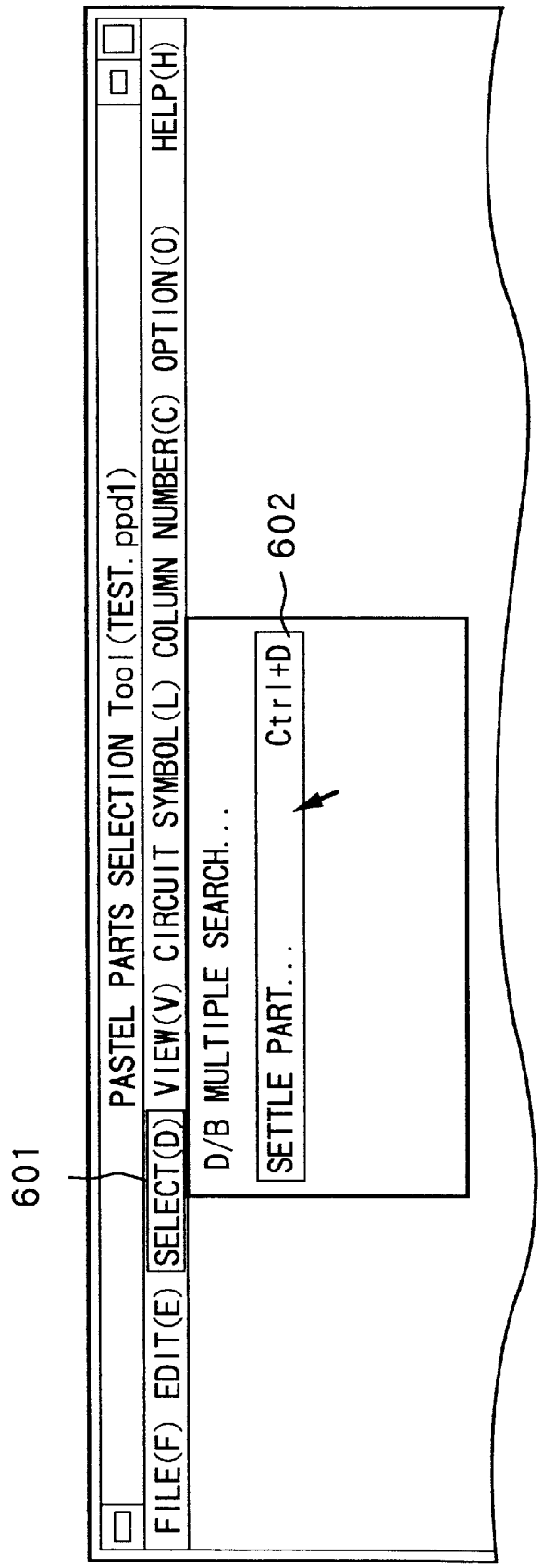
FIG. 15 shows a menu displayed upon executing parts selection according to the embodiment of the present invention.

FIG. 15 shows a menu displayed upon executing parts selection according to the embodiment of the present invention.

FIG. 16 shows a panel used for setting the search condition upon executing parts selection according to the embodiment of the present invention.

Figure 17:
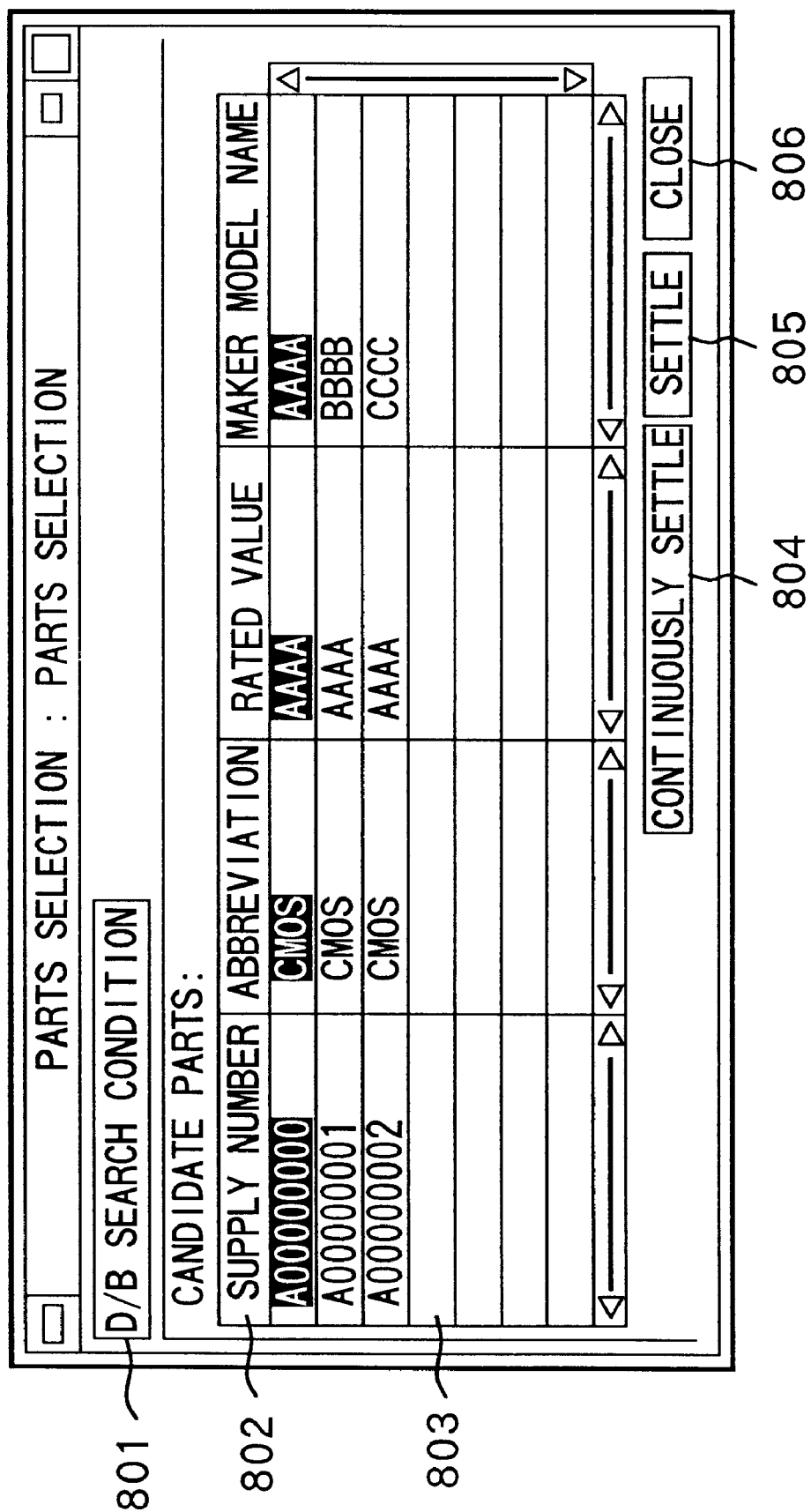
FIG. 17 shows a panel used for settling a part from a plurality of search results according to the embodiment of the present invention.

FIG. 17 shows a panel used for settling a part from a plurality of search results according to the embodiment of the present invention.

Step S1601: The operator designates a "parts selection" item 602 from a pull-down menu displayed by selecting a "selection" item 601 on the menu bar shown in FIG. 15. As a result, the panel shown in FIG. 16 is displayed.

Steps S1602 & S1603: The operator inputs search conditions used upon searching the parts database 9 in a display area 701 corresponding to the item in the display area 303 in FIG. 10 in units of items. When a cell is selected on the main window, information in the row of the selected cell is set as a default in each field of "condition". When no cell is selected, these fields are blank. Also, the matching mode (search condition) is determined in units of items as in the multiple search.

Step S1604: The operator selects a host computer that comprises the parts database 9 to be searched from a list in the display area 702.

Step S1605: When the operator designates an operation button 703, a search is executed under the conditions set in the above procedure. When the number of search results is zero, a message indicating this is displayed on a display area 705 to request the operator to re-set the search condition and the like. To cancel the search or to close the panel shown in FIG. 16, an operation button 704 is designated. Search results are displayed on a display area 803 in FIG. 17. When a button that displays an item name 802 is designated, another item is displayed.

Step S1606 & S1610: When a cell is selected on the main window, the operator designates one of part candidates to be selected displayed on the display area 803, and designates an operation button 805 to settle the parts of the selected cell. In a preferred embodiment, the display area 803 may be displayed in accordance with the priority order registered in advance.

Steps S1607 & S1608.: After the operator designates one of part candidates to be selected displayed on the display area 803, and designates an operation button 804, he or she designates the display areas 302 and 303 on the main window, thus continuously settling parts for reference symbols in the corresponding rows to be the parts designated in the display area 803.

Step S1609: When a target part is not found from the displayed search results or when the search condition is wrong, the operator designates a button 801 to re-display the panel shown in FIG. 16. To cancel parts selection or to close the panel shown in FIG. 17, an operation button 806 is designated.

Figure 18:
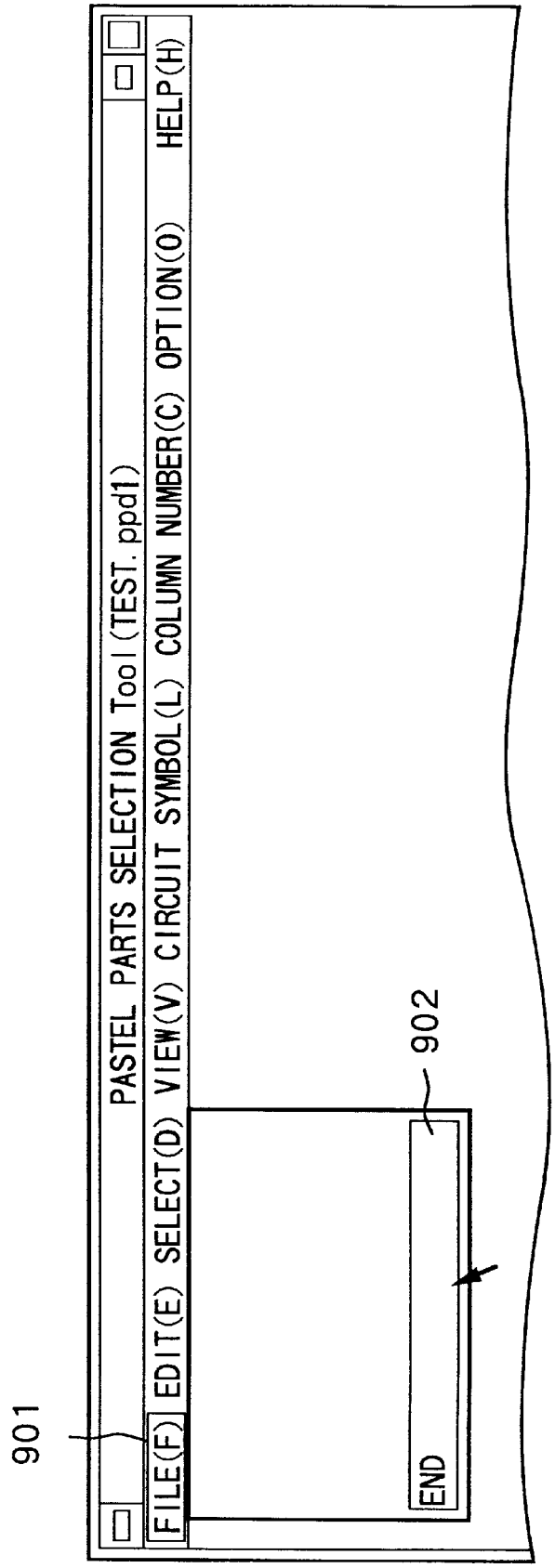
FIG. 18 is a view for explaining the method of ending the parts selection program according to the embodiment of the present invention.

FIG. 18 is a view for explaining the method of ending the parts selection program. The operator designates a "file" item 901 on the menu bar on the main window (FIG. 10) to display a pull-down menu, and designates an "end" item 902 from that menu, thus ending the parts selection program 10. Upon ending, the parts selection program 10 outputs information to be written in circuit diagram data of the electric CAD system 1, i.e., a BA intermediate file including data such as supply numbers, rated values, and the like generated upon selection of parts from the start to end of the parts selection program to the BA intermediate data 13.

Information Write Program 5

Information of the BA intermediate data 13 is written in the electric CAD system 1 by the information write program 5.

Figure 19:
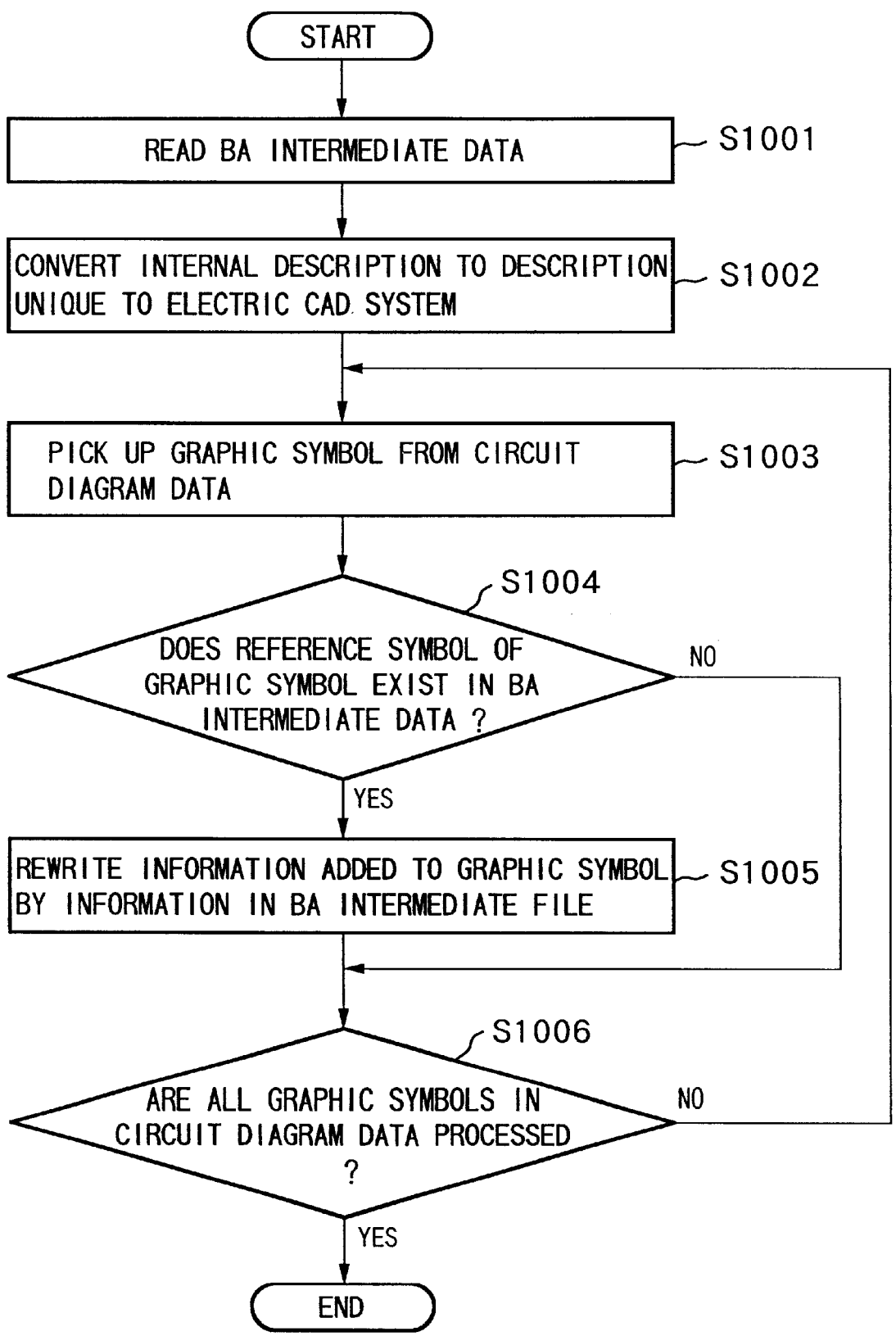
FIG. 19 is a flow chart showing the processing of an information write program according to the embodiment of the present invention.

FIG. 19 is a flow chart showing the processing of the information write program according to the embodiment of the present invention.

In FIG. 19, the information write program 5 reads a BA intermediate file from the BA intermediate data 13 (step S1001), and converts descriptions in the parts selection system to those (data types, formats, variable names, and the like) unique to the current target electric CAD system (step S1002) For example, in the CAD system that does not allow descriptions in English small letters described above, unit symbols are inversely converted into English capital letters complying with JIS X01240 shown in FIG. 9.

Steps S1003 to S1006 form a routine for writing data in the BA intermediate file one by one in circuit diagram data of the electric CAD system using symbols (data representing symbols) as keys. One symbol information is picked up from the circuit diagram data of the target electric CAD system (step S1003), and it is checked using a reference symbol as a key if the reference symbol of that symbol is included in data in the BA intermediate file (step S1004). If YES in step S1004, the information of that symbol is rewritten by the data in the BA intermediate file (step S1005), and the flow advances to step S1006. On the other hand, if NO in step S1004, the flow directly advances to step S1006. In step S1006, it is checked if all the pieces of information of symbols in the circuit diagram data are processed. If symbols to be processed still remain, the flow returns to step S1003 to repeat the same processing for the next symbol in the circuit diagram data.

Signal Address Extraction Program 3

The signal address extraction program 3 reads circuit diagram data of the electric CAD system 1, and outputs signal address data 12.

Figure 20:
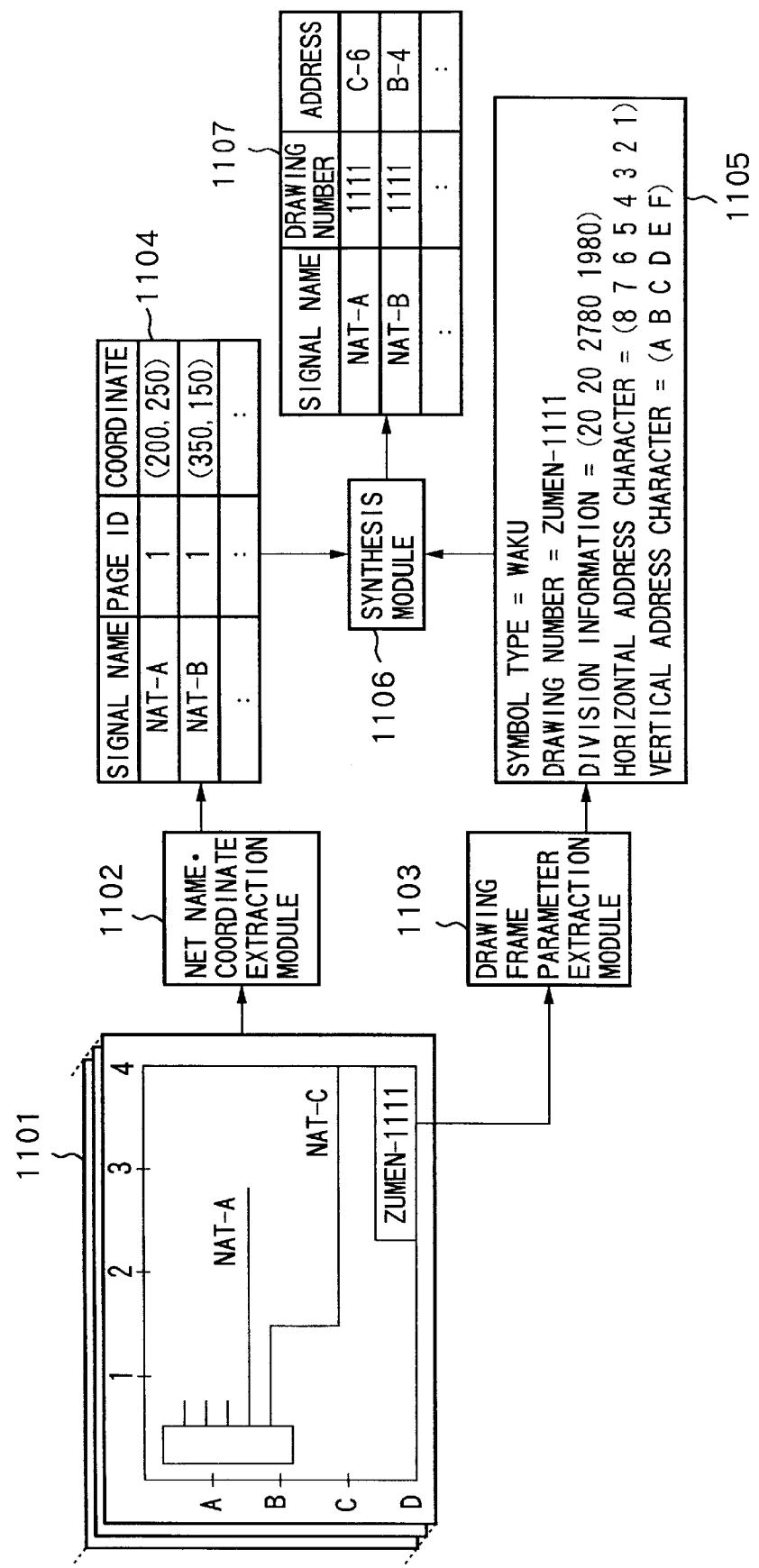
FIG. 20 is a diagram for explaining the processing of a signal address extraction program according to the embodiment of the present invention.

FIG. 20 is a diagram for explaining the processing of the signal address extraction program according to the embodiment of the present invention.

Figure 1:
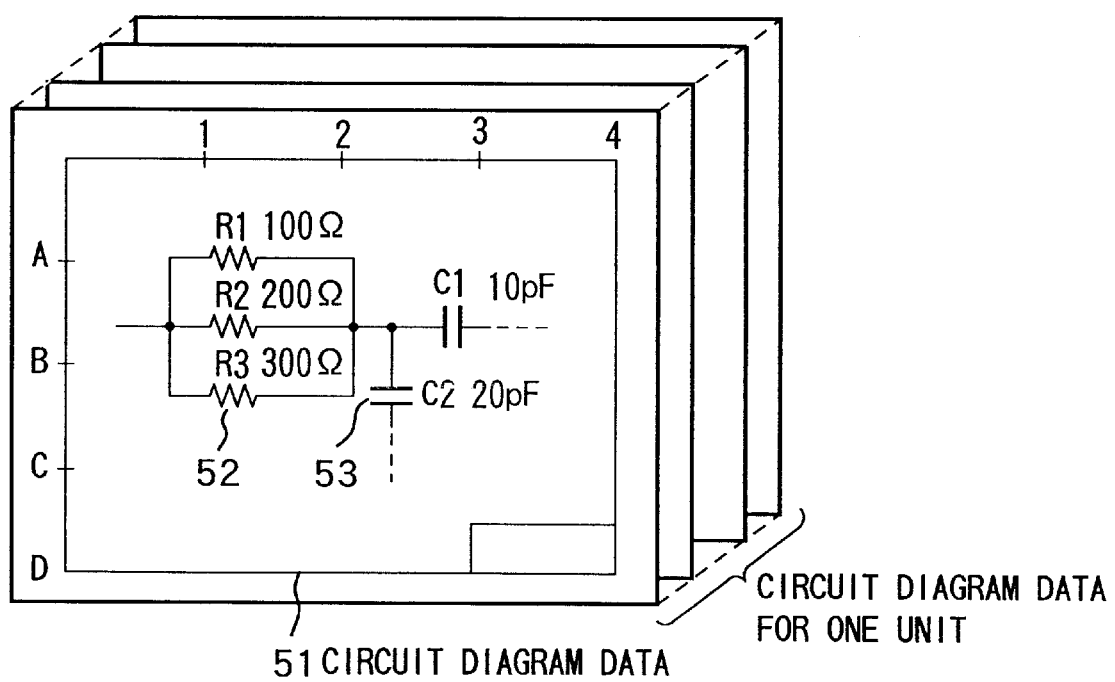
FIG. 1 is an explanatory view of the arrangement of circuit diagram data according to the prior art.
Figure 2:
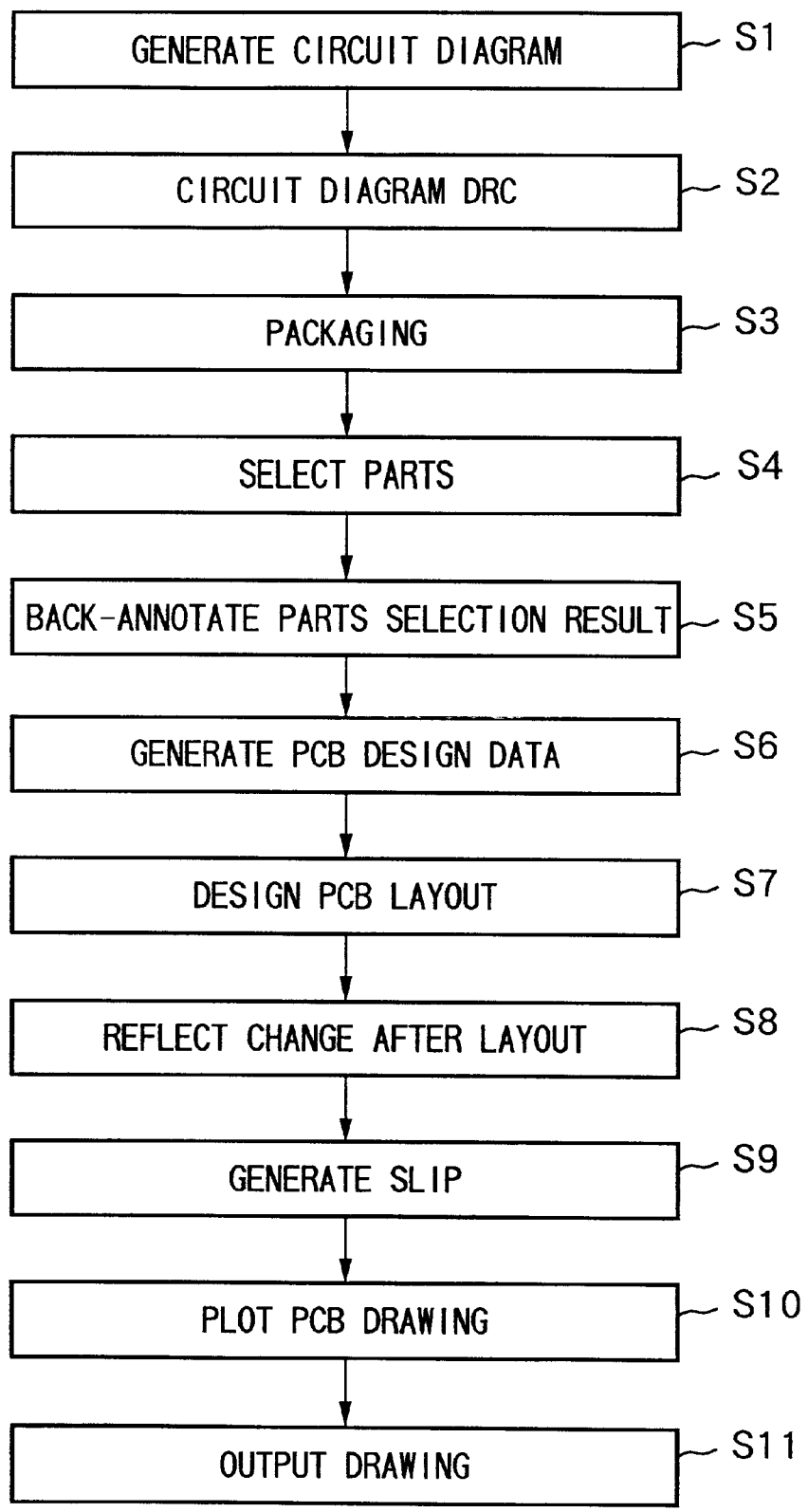
FIG. 2 is a flow chart for explaining the process flow in the manufacture of a printed circuit board according to the prior art.

In FIG. 20, reference numeral 1101 denotes circuit diagram data created by the electric CAD system 1. The circuit diagram data 1101 is described on a work sheet with vertical and horizontal addresses when it is displayed or printed, as shown in FIG. 1 described earlier. NAT-A, NAT-C, and the like are signal names.

The signal address extraction program 3 extracts net names and coordinates from the circuit diagram data 1101 of the corresponding electric CAD system using a net name coordinate extraction module 1102, and generates a table 1104.

Note that the net name is an identification name assigned for identifying a net (connection) to be commonly used in different drawings. For example, in a large-scale circuit which cannot be written in a single circuit diagram, connections are defined using net names among a plurality of circuit diagrams. The designer assigns an identical net name to an identical net. In general, the electric CAD system has a function of assigning net names.

On the other hand, a page ID is an identification number assigned by the electric CAD system in units of circuit diagrams.

The coordinate point is a value indicating a position on a two-dimensional panel defined by the electric CAD system to create, edit, and display a circuit diagram. In this case, as the method of indicating the coordinate system (e.g., coordinate axes) is not expressed on a circuit diagram, it is difficult to detect the position of the target net name if the coordinate values are directly used. For this reason, a position is expressed using numbers (addresses) added along a drawing frame.

As the drawing frame, A3 and A4 paper sizes are prepared in advance, and can be selected by the designer. By setting parameters for determining the relationship between the coordinates and addresses on the drawing frame, a change in paper size can be coped with. This is because circuit diagrams are not always drawn on paper sheets of an identical size, and may have different sizes, e.g., the first circuit diagram is drawn on an A3 sheet, and the second circuit diagram is drawn on an A4 sheet. For this reason, drawings having different sizes have different correspondences between the coordinates and addresses. Also, the drawing number of a circuit diagram is set as the parameter of the drawing frame.

The signal address extraction program 3 extracts drawing numbers in units of pages, and information for determining address values from information of the drawing frame of the circuit diagram data 1101 of the corresponding electric CAD system using a drawing frame parameter extraction module 1103. Parameters 1105 of the drawing frame are extracted in correspondence with the number of drawings corresponding to page IDs.

Note that the symbol type is used for discriminating the drawing frame from symbols of, e.g., resistors and the like set on a circuit diagram.

Division information includes a length and width designated by addresses, and the coordinates of a start point.

Address characters are characters used as addresses, and the number of address characters also determines the number of divisions.

The signal address extraction program 3 then synthesizes the information of the table 1104 and the information 1105 of the drawing frame to generate a table 1107 that relates the signal names to the drawing numbers and address values where the corresponding signal names are described. The program 3 outputs the generated information to the signal address data 12. Finally, the slip display program 23 or slip plot program 24 is executed using the signal address data 12, thus displaying/printing the signal address table shown in FIG. 25.

Title Column Input Program 22

The title column input program 22 can simultaneously write information to be filled in the title columns of slips in designated slips.

FIG. 21 shows the main window of the title column input program according to the embodiment of the present invention. The operator designates a menu bar 1201 on a main window 1202 and then designates items in a pulldown menu (not shown) so as to execute various functions. The principal function of this program is a simultaneous write of information (comment, date, creator of drawing, and the like) to the title columns of the designated slips. A simple message from the program is displayed in a display area 1203.

Modification of Embodiment

In the above embodiment, the operator must designate the target electric CAD system. In a preferred embodiment, the target electric CAD system is automatically identified in accordance with the data structure, data format, and the like to select a proper interface tool. In this modification, as shown in FIG. 37, one CAD interface software program group is prepared for the respective systems, and each program has a conversion module and conversion table. For example, in case of the part information extraction program 2, a conversion table 202 registers in advance the data structure (the correspondence between the byte positions and described information, and the like) in the circuit diagram data of the individual electric CAD systems corresponding to the predetermined item data (reference symbols, graphic symbols, and the like) of the parts selection data 11 in units of electric CAD systems. Upon detecting selection of one electric CAD system by the operator, a conversion module 201 looks up the conversion table 202 using the detection result as a key, and extracts information of predetermined items from the circuit diagram data in accordance with the data stored in the conversion table 202. On the other hand, for example, since the information write program 5 must re-convert the data structure to that of each electric CAD system, the processing opposite to that of the part information extraction program 2 is done. Since other processing is the same as that in the above embodiment, a detailed description thereof will be omitted.

Note that the objects of the present invention are also achieved by supplying a storage medium, which records a program code of a software program that can realize the functions of the above-mentioned embodiments to the system or apparatus, and reading out and executing the program code stored in the storage medium by a computer (or a CPU or MPU) of the system or apparatus.

In this case, the program code itself read out from the storage medium realizes the functions of the above-mentioned embodiments, and the storage medium which stores the program code constitutes the present invention.

As the storage medium for supplying the program code, for example, a floppy disk, hard disk, optical disk, magneto-optical disk, CD-ROM, CD-R, magnetic tape, nonvolatile memory card, ROM, and the like may be used.

The functions of the above-mentioned embodiments may be realized not only by executing the readout program code by the computer but also by some or all of actual processing operations executed by an OS (operating system) running on the computer on the basis of an instruction of the program code.

Furthermore, the functions of the above-mentioned embodiments may be realized by some or all of actual processing operations executed by a CPU or the like arranged in a function extension board or a function extension unit, which is inserted in or connected to the computer, after the program code read out from the storage medium is written in a memory of the extension board or unit.

According to the system described above, even when a plurality of different electric CAD systems are used, parts selection data standardized using a common platform is obtained. Even when the individual departments require information in different formats due to their different roles, information suitable for each department can be efficiently acquired like the slips shown in, e.g., FIGS. 23 to 27.

As described above, according to the above embodiment, a parts selection apparatus and parts selection system which do not depend on the data structures of design drawings can be provided.

As many apparently widely different embodiments of the present invention can be made without departing from the spirit and scope thereof, it is to be understood that the invention is not limited to the specific embodiments thereof except as defined in the appended claims.

What is claimed is:

1. A parts selection apparatus for selecting parts that make up a product from database means which registers information associated with a plurality of parts, characterized by comprising:
information extraction means for extracting information of a predetermined item from external information and generating selection information to be processed by said parts selection apparatus;
parts selection means for selecting, from said database means, a part in accordance with the selection information generated by said information extraction means, and writing the selection result in the selection information;
information output means for outputting the selection information in which the selection result is written by said parts selection means; and
in that a plurality of pairs of information extraction means and information output means equivalent to said information extraction means and said information output means are arranged in correspondence with external information generated in different software formats, and can be selected in accordance with the software format of the external information.

2. The apparatus according to claim 1, characterized in that said information output means outputs the selection information in which the selection result is written by said parts selection means to the external information.

3. The apparatus according to claim 2, characterized in that said information extraction means comprises:
related information extraction means for extracting reference symbols assigned to individual parts and their related information included in the external information;
description format conversion means for converting a description format unique to the external information to a description format to be processed by said parts selection apparatus; and
selection information edit means having a function of generating new selection information on the basis of information converted by said description format conversion means and a function of matching the new selection information generated by the function and existing selection information.

4. The apparatus according to claim 2, characterized in that said information output means comprises:
selection information extraction means for extracting information corresponding to the information of the predetermined item in the selection information;
description format inverse conversion means for inversely converting the information extracted by said selection information extraction means into a description format unique to the external information; and
inversely converted information output means for outputting the inversely converted information obtained by said description format inverse conversion means to the external information.

5. The apparatus according to claim 1, characterized in that said information extraction means comprises:
related information extraction means for extracting reference symbols assigned to individual parts and their related information included in the external information;
description format conversion means for converting a description format unique to the external information to a description format to be processed by said parts selection apparatus; and
selection information edit means having a function of generating new selection information on the basis of information converted by said description format conversion means and a function of matching the new selection information generated by the function and existing selection information.

6. The apparatus according to claim 5, characterized in that said information extraction means further comprises mismatching information output means for detecting mismatching between the new selection information and the existing selection information, and outputting the mismatching information to the external information and/or the selection information.

7. The apparatus according to claim 5, characterized in that said information extraction means further comprises mismatching information output means for detecting mismatching between the new selection information and the existing selection information, and outputting the mismatching information to the selection information.

8. The apparatus according to claim 1, characterized in that when said parts selection means selects a part in accordance with the selection information generated by said information extraction means and obtains a plurality of parts as selection candidates, said parts selection means selects a part with higher priority in accordance with a priority order registered in advance.

9. The apparatus according to claim 1, characterized in that said parts selection means comprises:

search condition extraction means for extracting a search condition in accordance with information corresponding to the information of the predetermined item in the selection information;

search condition generation means for generating a search condition based on an external input;

search condition changing means for adding and/or changing a search condition based on an external input; and database search means for searching said database means in accordance with the search condition obtained by one of said search condition extraction means, search condition generation means, and said search condition changing means.

10. The apparatus according to claim 9, characterized in that said parts selection means further comprises:

display means for displaying search results of said database search means as parts of selection candidates; and parts determination means for selecting one of the parts of the selection candidates displayed by said display means.

11. The apparatus according to claim 10, characterized in that said parts determination means selects one of the parts of the selection candidates displayed by said display means in accordance with an external input.

12. The apparatus according to claim 9, characterized by further comprising database selection means for, when a plurality of database means equivalent to said database means are arranged, selecting one of said database means.

13. The apparatus according to claim 1, characterized in that said information output means comprises:

selection information extraction means for extracting information corresponding to the information of the predetermined item in the selection information of the predetermined item in the selection information;

description format inverse conversion means for inversely converting the information extracted by said selection information extraction means into a description format unique to the external information; and inversely converted information output means for outputting the inversely converted information obtained by said description format inverse conversion means to the external information.

14. The apparatus according to claim 1, characterized by further comprising:

drawing information generation means for generating drawing information on the basis of the selection information; and drawing output means for outputting the drawing information output from said drawing information generation means, and in that a plurality of drawing output means equivalent to said drawing output means are arranged, and are selected in correspondence with a target output method.

15. The apparatus according to claim 14, characterized by further comprising:

drawing information extraction means for extracting information required for said drawing information generation means from the external information, and in that a plurality of drawing information extraction means equivalent to said drawing information extraction means are arranged in correspondence with a plurality of pieces of external information generated in different formats, and are selected in correspondence with input external information.

16. The apparatus according to claim 3, characterized in that said database means registers in advance at least a number of a part and information required for selecting that part, and said parts selection means writes at least the number of the part as the selection result using the reference symbol extracted by said information extraction means as a key.

17. The apparatus according to claim 16, characterized in that the information required for selecting the part includes a rated value, maker, and maker model name.

18. The apparatus according to claim 3, characterized in that said database means registers in advance at least a rated value, maker, and maker model name of the part; and said parts selection means writes at least information associated with the rated value, maker and maker model name of the part as the selection result using the reference symbol extracted by said information extraction means as a key.

19. The apparatus according to claim 1, characterized in that said parts selection apparatus is a parts selection apparatus for selecting parts that make up a printed circuit board; and printed circuit board design information generation means for generating printed circuit board design information on the basis of the selection information;

the interface means for interfacing the information generated by said printed circuit board design information generation means to an external printed circuit board design apparatus; and a plurality of interface means equivalent to said interface means are arranged in correspondence with external printed circuit board design apparatuses that process information in different formats, and are selected in accordance with a target external printed circuit board design apparatus.

20. The apparatus according to claim 1, characterized in that said parts selection apparatus is a parts selection apparatus for selecting parts that make up a printed circuit board, said apparatus further comprises:

printed circuit board information extraction means for extracting printed circuit board design information from the external information; and a plurality of printed circuit board information extraction means are arranged in correspondence with a plurality of pieces of external information generated in different formats, and are selected in accordance with input external information.

21. The apparatus according to claim 1, characterized by further comprising:

external factor storage means for storing a plurality of combinations of said information extraction means and/or information output means selected in advance in accordance with a format of the external information and an external factor; and execution means for executing in turn said information extraction means and/or said information output means stored in the combination information selected from the plurality of pieces of combination information stored in said external factor storage means.

22. A parts selection system which comprises design means for designing a product, and parts selection means for selecting parts that make up the product from database means which registers information associated with a plurality of parts, characterized in that said parts selection means comprises:

information extraction means for extracting information of a predetermined item from design information generated by said design means;

generating selecting information to be processed by said parts selection apparatus;

parts selection means for selecting, from said database means, a part in accordance with the selection information generated by said information extraction means, and writing the selection result in the selection information;

information output means for outputting the selection information in which the selection result is written by said parts selection means; and a plurality of pairs of information extraction means and information output means equivalent to said information extraction means are arranged in correspondence with the design information generated in different software formats, and can be selected in accordance with design means of the design information.

23. The system according to claim 22, characterized in that said information output means outputs the selection information in which the selection result is written by said parts selection means to the design information.

24. The system according to claim 23, characterized in that said information extraction means comprises:

related information extraction means for extracting reference symbols assigned to individual parts and their related information included in the design information;

description format conversion means for converting a description format unique to the design information to a description format to be processed by said parts selection apparatus; and selection information edit means having a function of generating new selection information on the basis of information converted by said description format conversion means and a function of matching the new selection information generated by the function and existing selection information.

25. The system according to claim 22, characterized in that said information extraction means comprises:

related information extraction means for extracting reference symbols assigned to individual parts and their related information included in the design information;

description format conversion means for converting a description format unique to the design information to a description format to be processed by said parts selection apparatus; and selection information edit means having a function of generating new selection information on the basis of information converted by said description format conversion means and a function of matching the new selection information generated by the function and existing selection information.

26. The system according to claim 25, characterized in that said database means registered in advance at least a rated value, a maker model name of the part; and said parts selection means writes at least information associated with the rated value, maker, and maker model name of the part as the selection result using the reference symbol extracted by said information extraction means as a key.

27. The system according to claim 25, characterized in that said database means registers in advance at least a number of a part and information required for selecting that part, and said parts selection means writes at least the number of the part as the selection result using the reference symbol extracted by said information extraction means as a key.

28. The system according to claim 27, characterized in that the information required for selecting the part includes a rated value, maker, and maker model name.

29. The system according to claim 22, characterized in that when said parts selection means selects a part in accordance with the selection information generated by said information extraction means and obtains a plurality of parts as selection candidates, said parts selection means selects a part with higher priority in accordance with a priority order registered in advance.

* * * * *

UNITED STATES PATENT AND TRADEMARK OFFICE
CERTIFICATE OF CORRECTION

PATENT NO. : 6,289,254 B1
DATED : September 11, 2001
INVENTOR(S) : Shimizu et al.

It is certified that error appears in the above-identified patent and that said Letters Patent is hereby corrected as shown below:

Column 2,
Line 7, delete "re-stored" and insert therefor -- pre-stored --

Column 10,
Line 16, delete "1705" and insert therefor -- 1750 --

Column 11,
Line 14, delete "premise-that" and insert therefor -- premise that --

Column 15,
Line 45, delete "shows'a" and insert therefor -- shows a --

Column 16,
Line 15, delete "S1608.:" and insert therefor -- S1608: --

Column 22,
Line 24, delete "and"
Line 25, insert -- the -- before: printed circuit Signed and Sealed this Twenty-sixth Day of March, 2002

Attest:

JAMES E. ROGAN
*Attesting Officer*     *Director of the United States Patent and Trademark Office*